United States Patent
Taura et al.

[11] Patent Number: 5,614,944
[45] Date of Patent: Mar. 25, 1997

[54] TEST METHOD AND APPARATUS OF SEQUENTIALLY EXECUTING SYNCHRONOUS SIGNAL TEST, DOT LEVEL TEST, AND GRADATION TEST OF A VIDEO SIGNAL GENERATOR

[75] Inventors: Toru Taura; Hirobumi Inoue, both of Tokyo, Japan

[73] Assignee: NEC Corporation, Tokyo, Japan

[21] Appl. No.: 413,903

[22] Filed: Mar. 30, 1995

[30] Foreign Application Priority Data

Mar. 30, 1994 [JP] Japan .................................. 6-061745
Jun. 27, 1994 [JP] Japan .................................. 6-144290

[51] Int. Cl.$^6$ .................................................. H04N 17/00
[52] U.S. Cl. .......................... 348/183; 348/181; 348/179; 348/194; 382/218
[58] Field of Search ..................................... 348/177, 180, 348/181, 189, 183, 194, 178, 179, 182, 190, 657; 382/217, 218; 371/20.4, 27; H04N 17/00

[56] References Cited

U.S. PATENT DOCUMENTS

| | | |
|---|---|---|
| 4,093,960 | 6/1978 | Estes .................................... 348/182 |
| 4,670,782 | 6/1987 | Harshbarger et al. ................... 348/183 |
| 4,791,475 | 12/1988 | Lopez et al. ............................ 348/194 |
| 5,036,251 | 7/1991 | Lee ........................................ 348/180 |
| 5,251,265 | 10/1993 | Döhle et al. ............................ 382/218 |
| 5,459,530 | 10/1995 | Andersson et al. ..................... 348/179 |

FOREIGN PATENT DOCUMENTS 60-229092  11/1985  Japan .............................. H04N 17/00

Primary Examiner—John K. Peng
Assistant Examiner—Jeffrey S. Murrell
Attorney, Agent, or Firm—Sughrue, Mion, Zinn, Macpeak & Seas

[57] ABSTRACT

In a video signal test, a sync signal test is first performed in which specification items of sync signals are measured. If the result is good, then a dot level test is performed using a dot discriminating pattern in which a dot level of the video signal changes between the maximum value and the minimum value for every dot. If the result is good, then a gradation test is finally performed using a gradation change pattern in which the gradation gradually changes for every horizontal line. In a case that the gradation test result is determined to be good, the functions of the video signal generator are finally judged to be good. On the other hand, if any one of the testing results is not good, the function test is ended at that stage without executing the next test.

50 Claims, 16 Drawing Sheets

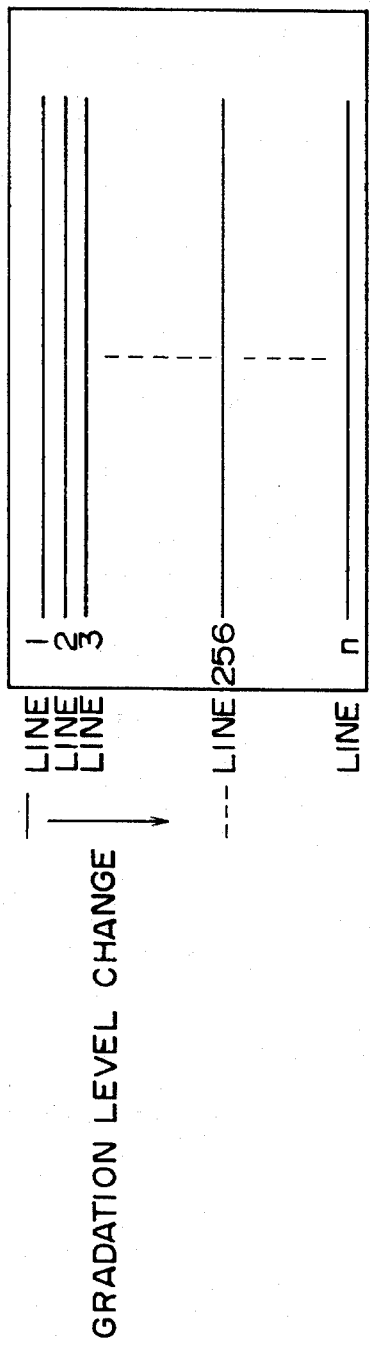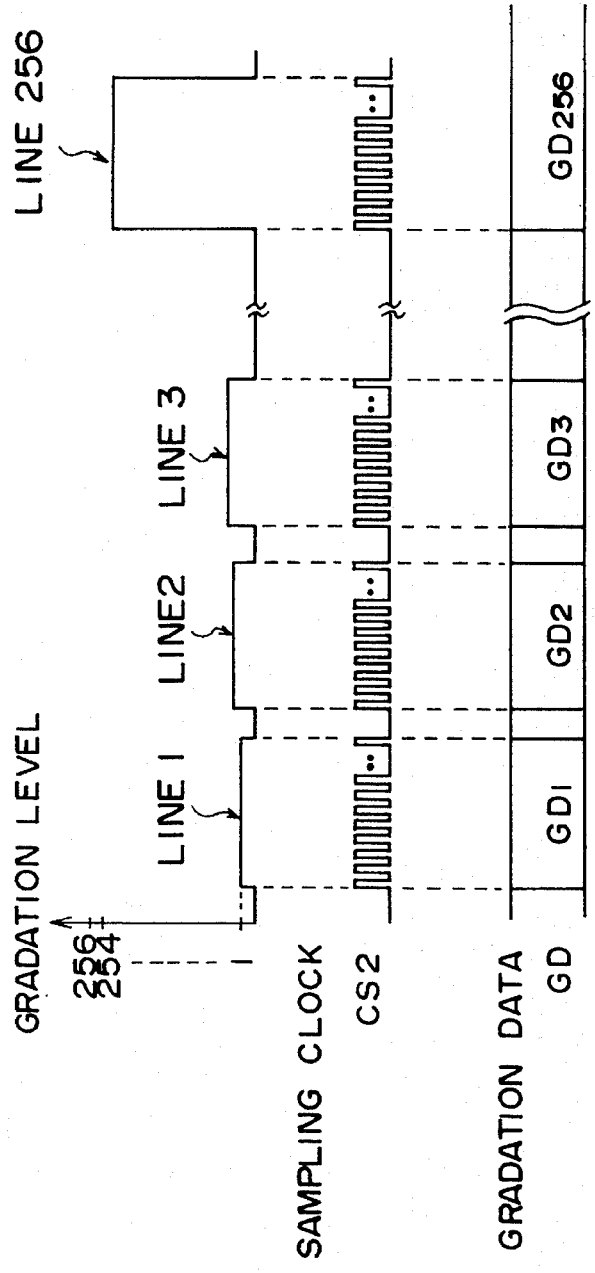

TEST METHOD AND APPARATUS OF SEQUENTIALLY EXECUTING SYNCHRONOUS SIGNAL TEST, DOT LEVEL TEST, AND GRADATION TEST OF A VIDEO SIGNAL GENERATOR

BACKGROUND OF THE INVENTION

1. Field of the Invention

The present invention relates to test of a video signal, and more particularly, to a method and apparatus for performing a function test of a video signal generator.

2. Related Art

As a video display becomes a high resolution with high fidelity of color, the quality of a video signal generator becomes very important. For this reason, it is required strongly to perform the function test of the video signal generator accurately and at high speed.

An example of a conventional test apparatus is disclosed in Japanese Patent Laid Open No. Sho 60-229092. In FIG. 1, a video signal generator 900 is a circuit to be tested, and the other circuits constitute the conventional test apparatus. The same circuit as the video signal generator 900 is incorporated in the test apparatus. More particularly, the test apparatus has a dot counter 903, a display controller 905, a multiplexer 906, an image memory 908, a blink counter 909, and a display control circuit 910. These circuits correspond to the circuits 912–916 incorporated in the video signal generator 900.

The test apparatus extracts a dot clock signal 919, a vertical sync signal 920, and a blink signal 921 from the video signal generator 900 through probes and supplies them to a character clock comparator 902, a vertical sync signal comparator 904, and a blink signal comparator 907, respectively. These signal are subjected to three steps of synchronization to synchronize the test apparatus with the video signal generator 900 such that the operation states of both of the test apparatus and the video signal generator 900 is completely identical. After the synchronization has been completed, a video signal 923 output from the display control circuit 910 is compared with a video signal 922 output from the display control circuit 917 by a video signal comparator 918 using the dot clock signal 919 as a sampling clock. Using the comparison results, a central processing unit 901 determines whether or not the video signals 923 and 922 are identical to each other. When either one of the dot clock signal 919, the vertical sync signal 920 or the blink signal 921 cannot be synchronized during the determination of the video signals, the character clock comparator 902, the vertical sync signal comparator 904 or the blink signal comparator 907 generates an interrupt signal to the central processing unit 901. The interrupt signal inhibits the central processing unit 901 from determining the output of the video signal comparator 918 until the test apparatus and the video signal generator 900 are synchronized with each other.

However, the conventional test apparatus is necessary to be provided with a circuit having the same function as the video signal generator 900 to be tested. Furthermore, the dot clock signal 919 is extracted from the oscillator 911 of the video signal generator 900 and is used for the character clock comparison and the sampling of the video signals. Therefore, it is required to provide different test apparatuses depending on the function and operation speed of the video signal generator 900 to be tested.

In addition the circuits having the same function as the video signal generator 900, the respective comparing circuits of the character clock signals, the vertical sync signals, the blink signals and the video signals are required. Therefore, the circuit structure becomes complicated and the amount of hardware increases. Furthermore, as the number of dots in the color display is increases, an image memory having a larger amount of capacity is required in the test apparatus.

Further, in the conventional test method, since various types of test are performed after the synchronization with the video signal generator has been established, the sync signals is not tested quantitatively. For this reason, every time the test apparatus is out of synchronization with the video signal generator, the test has to go back to the beginning. Furthermore, since it is unknown whether the sync signals are generated by the video signal generator precisely or not, it is difficult to specify a failed function of the video signal generator accurately.

SUMMARY OF THE INVENTION

An object of the present invention is to provide a video signal testing method and apparatus which can perform the function test of a video signal generator at high speed and highly accurately.

Another object of the present invention is to provide a video signal testing method and apparatus which can test various types of video signal generators having different functions and performances.

Still another object of the present invention is to provide a video signal testing apparatus having a simple circuit structure and a small amount of hardware.

Yet still another object of the present invention is to provide a video signal testing method and apparatus which can readily specify a fault function of the tested video signal generator.

In a video signal testing method according to the present invention, a sync signal test is first performed. If the result is good, then a level test is performed for every dot. If the result is good, then a gradation test is finally performed for every horizontal line. In a case that the gradation test result is determined to be good, the functions of the video signal generator are finally judged to be good. On the other hand, if any one of the testing results is not good, the function test is ended at that stage without executing the next test. For instance, if the dot level test result is not good, it is determined at that stage that the video signal generator is fault in function and the function test is ended.

In the sync signal test, specification items of a sync signal, for example, a period, a pulse width, a front porch width, and a back porch width, are measured using a predetermined clock signal, and it is determined whether each measurement value falls within a permissible region of a specification value. If all the measurement values fall within the permissible regions, the sync signal test is passed, while if at least one measurement value is outside of the permissible region, the sync signal test is not passed.

In a case that the sync signal test is passed, the next dot level test is executed. In the dot level test, the video signal generator is designated to generate a dot discriminating pattern in which a dot level of the video signal changes between the maximum value and the minimum value for every dot. The video signal generated by the video signal generator is converted into a digital dot level value for every dot and it is determined whether a dot level pattern having the digital dot level values for a frame is coincident with the dot discriminating pattern. If both the patterns are coincident with each other, the dot level pattern passes the dot level test because all the dots are in a normal state. However, if there is any incoincident data, the dot level pattern cannot pass the dot level test.

In a case that the video signal passes the dot level test, a gradation test is subsequently performed. In the gradation test, the video signal generator is designated to generate a gradation change pattern in which the gradation gradually changes for every horizontal line. The gradation level of the generated video signal is converted into a digital gradation level value and it is determined whether the digital gradation level value falls within a permissible region of a specification value of the gradation change pattern. If the gradation level value falls within the permissible region, the video signal passes the gradation test, while if the gradation level value is outside of the permissive value, the video signal cannot pass the gradation test.

A test apparatus for the video signal generator according to the present invention is comprised of a sync signal test section, a dot level test section, a gradation test section, and a processing section for controlling the operations of the test sections. The processing section performs the dot level test and the gradation test by supplying a pattern designation signal to the video signal generator such that the video signal generator generates the respective video signals corresponding to the dot discriminating pattern and the gradation change pattern.

Preferably, a selector is provided to select one of the R, G and B color signals of the video signal and the selected color signal is converted into digital data which are stored in a memory to perform the dot level test or the gradation test.

The dot level test section is preferably provided with an averaging circuit which averages the dot level data in dots before dot level determination.

BRIEF DESCRIPTION OF THE DRAWINGS

FIG. 8A is a schematic diagram showing a gradation test pattern in the first embodiment;

FIG. 8B is a waveform diagram for explaining the operation of the gradation test in the first embodiment;

DETAILED DESCRIPTION OF THE PREFERRED EMBODIMENTS

FIRST EMBODIMENT

Figure 1:
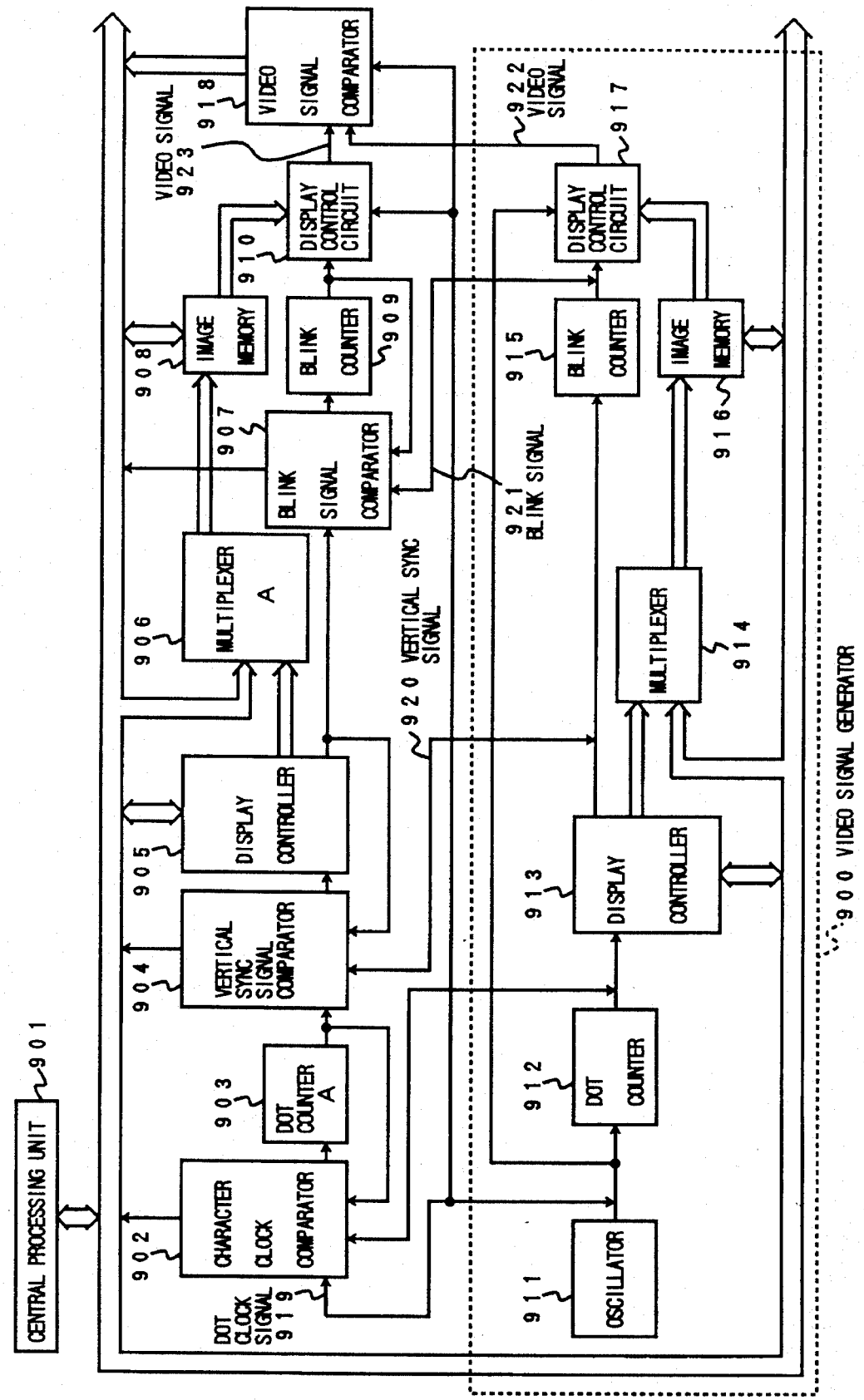
FIG. 1 is a block diagram showing a conventional video signal test apparatus.
Figure 2:
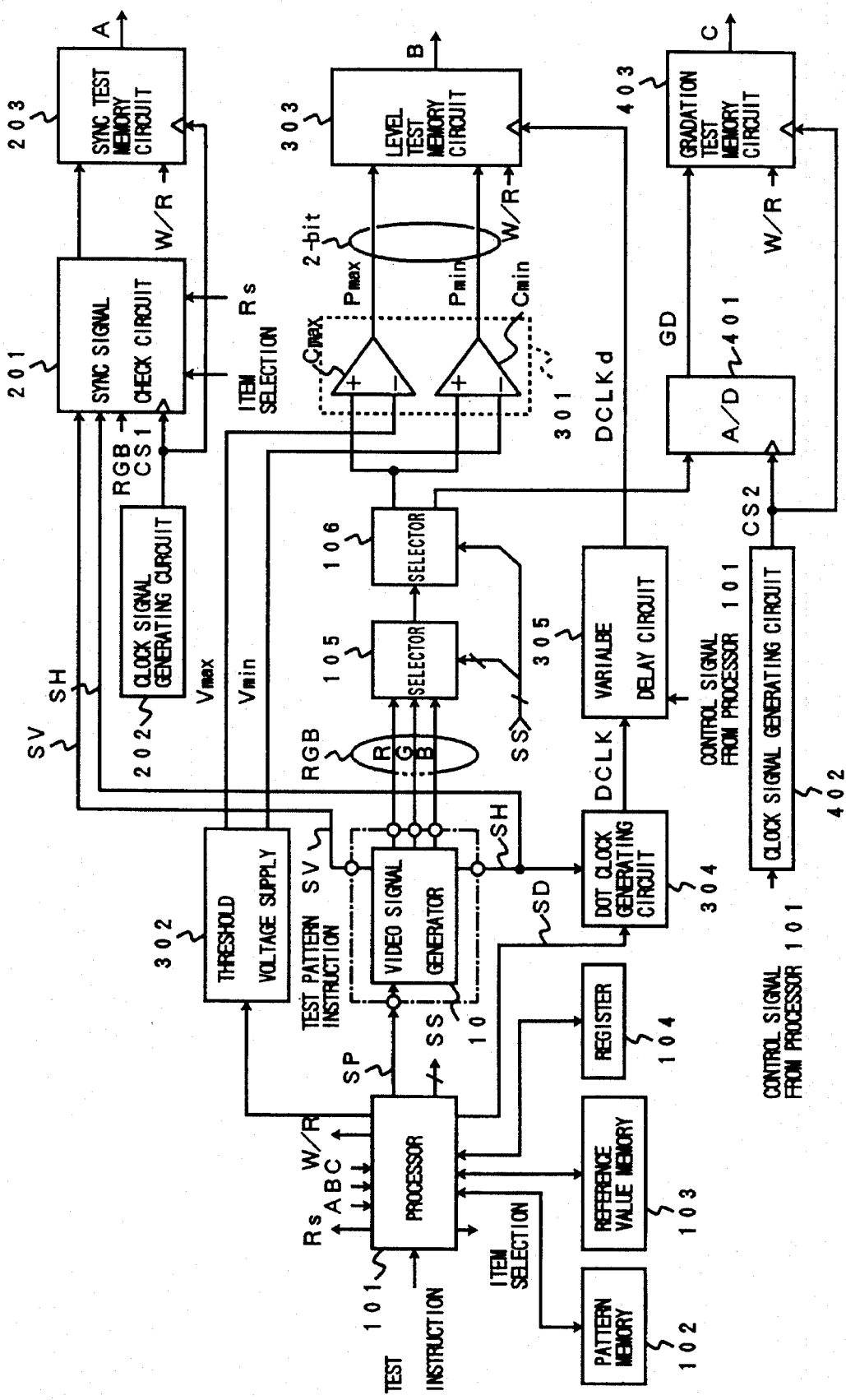
FIG. 2 is a block diagram showing a video signal test apparatus according to a first embodiment of the present invention.

Referring to FIG. 2, when a video signal generator 10 as an object to be tested is attached to a video signal test apparatus according to the present invention, a sync signal timing test, a dot level test, and a gradation test are sequentially performed in accordance with a test instruction supplied from the outside. The video signal test apparatus is comprised of a test processing section having a processor 101, a sync signal test section for performing timing check of the sync signal, a dot level test section for performing a dot level check in units of dots, and a gradation test section for performing a gradation check in horizontal lines over a frame.

Test Processing Section

The processor 101 is connected to a pattern memory 102, a reference value memory 103, and a register 104. The pattern memory 102 stores a plurality of pattern designating values respectively corresponding to the specifications of a plurality of video signal generators to be tested. Each of the pattern designating values designates one of three kinds of test pattern: a sync signal test pattern, a dot level test pattern, and a gradation test pattern.

A pattern designating value corresponding to the video signal generator 10 is designated according to the test instruction supplied from the outside. More specifically, in accordance with the test instruction, the processor 101 selects a corresponding pattern designating value from the pattern memory 102 and outputs it to the video signal generator 10 as a pattern designation signal SP. According to the pattern designation signal SP, the video signal generator 10 generates a RGB video signal comprising a R-color signal, a G-color signal and a B-color signal, a vertical sync signal SV, and a horizontal sync signal SH. More particularly, when the sync signal test pattern is designated, the video signal generator 10 outputs a RGB video signal in which all dot levels are set to the maximum. When the dot level test pattern is designated, the video signal generator 10 outputs the RGB video signal in which the maximum and the minimum of bright level alternatively appear for every dot. When the gradation test pattern is designated, the video signal generator 10 outputs the RGB video signal in which one horizontal line is at the same gradation level and the gradation level is changed in horizontal lines.

The reference value memory 103 stores reference values which are used for the processor 101 to determine whether the respective results A, B and C of the sync signal test, the level test, and the gradation test are good or not. The register 104 stores a pattern designating value corresponding to the video signal generator 10.

Three video output terminals (R, G, B) of the video signal generator 10 are connected to three input terminals of a selector 105, respectively. The single output terminal of the selector 105 is connected to the single input terminal of a selector 106, and the two output terminals of the selector 106 are connected to an analog comparator 301 and an A/D (Analog-to-digital) converter 401, respectively.

The selector 105 selects one of the R-color, G-color, and B-color signals of the RGB video signal output from the video signal generator 10 in accordance with the selection signal SS received from the processor 101. The selector 106 outputs to either the analog comparator 301 or the A/D converter 401 the signal selected by the selector 105 in accordance with the selection signal SS.

Sync Signal Test Section

In the sync signal test, a pattern is designated in such a manner that all dots have the maximum level in the RGB video signal output from the video signal generator 10.

The vertical sync signal SV and horizontal sync signal SH produced by the video signal generator 10 are output to a sync signal check circuit 201. The sync signal check circuit 201 measures the sync signal with respect to predetermined items consisting of a period of time, a pulse width, a back porch width, and a front porch width using the clock signal CS1 received from a clock signal generating circuit 202, as described later, and outputs the measurement values to a sync test memory circuit 203.

The clock signal CS1 is asynchronous with the horizontal sync signal SH and the frequency of the clock signal CS1 is given by the following equation:

$$f_{cs1}=(P_W \times H_D/100) \times (T_{M1}/100))^{-1} [Hz]$$

where $P_W$ is an ideal pulse width of the horizontal sync signal, $H_D$ is an permissible error (%), and $T_{M1}$, is a measurement precision (%).

The measurement values stored in a sync test memory circuit 203 are read out by the processor 101 where they are compared with the reference values stored in the reference value memory 103 to determine whether the vertical sync signal SV and horizontal sync signal SH are in a good state or not. For instance, if the measurement value $P_{W(m)}$ of the pulse width of the horizontal sync signal SH falls within the reference value $P_W(1 \pm H_D/100)$, the horizontal sync signal SH is determined to be in the good state, and otherwise, to be not in the good state.

It should be noted that the determination may be performed by the processor 101 each time the measurement on one selected item is completed or after the measurement values of all the items are stored in the sync test memory circuit 203.

Dot Level Test Section

In the dot level test, a pattern is designated in such a manner that the maximum level and the minimum level are alternatively repeated in dots of the video signal generated by the video signal generator 10.

The analog comparator 301 is comprised of two comparators Cmax and Cmin. Respective non-inverting input terminals of the comparators Cmax and Cmin are connected to one of the output terminals of the selector 106 and respective inverting input terminals thereof are connected to two output terminals of a threshold voltage supply 302. The threshold voltage supply 302 outputs two different threshold voltages Vmax and Vmin to the comparators Cmax and Cmin in accordance with the instruction from the processor 101, respectively. The voltage Vmax is a reference voltage used for checking the maximum level of each dot of the RGB video signal and the voltage Vmin is another reference voltage used for checking the minimum level of each dot. For instance, a value of 90% of the maximum level amplitude in each dot may be set as the voltage Vmax and a value of 10% thereof may be set as the voltage Vmin.

The comparator Cmax compares a dot voltage in each dot of the video signal with the voltage Vmax to output a pulse signal Pmax having a pulse width during which the dot voltage is higher than the voltage Vmax. The comparator Cmin compares the dot voltage with the voltage Vmin to output a pulse signal Pmin having a pulse width during which the dot voltage is higher than the voltage Vmin. These two pulse signals, Pmax and Pmin, are output to a level test memory circuit 303 as 2-bit dot level data. As described later, if the pulse width difference between the two pulse signals Pmax and Pmin falls within the range of a predetermined permissible error, the 2-bit dot level data repeats "00" ($0_{(16)}$) and "11" ($3_{(16)}$) alternatively for every dot. However, when the slope of rising/falling edge of the video signal in each dot becomes gentle due to any causes, both the signals are not coincident with each other and 2-bit data "01" appears to indicate the distortion of the repetitive pattern.

The 2-bit data composed of the pulse signals Pmax and Pmin are sequentially written onto the level test memory circuit 303 in accordance with a dot clock signal DCLKd received from a dot clock signal generating circuit 304 through a variable delay circuit 305. In this manner, the 2-bit data for a frame are stored in the level test memory circuit 303.

The dot clock signal generating circuit 304 generates a dot clock signal DCLK which is synchronized with the horizontal sync signal SH received from the video signal generator 10 and which has a frequency m times more than the horizontal sync signal SH, in accordance with a frequency division designation signal SD received from the processor 101.

The variable delay circuit 305 delays the dot clock signal DCLK received from the dot clock signal generating circuit 304 by a time period designated by a control signal from the processor 101 to adjust the phase relation between the output data (2-bit data) of the analog comparator 301 and the dot clock signal DCLK. Since the dot clock signal DCLK is synchronous with the horizontal sync signal SH, it is also synchronous with the video signal. However, the output data of the analog comparator 301 is not synchronous with the video signal because it is passed through the selector 105, the selector 106 and the analog comparator 301. The variable delay circuit 305 is provided to adjust the deviation in phase.

The dot level data stored in the level test memory circuit 303 are sequentially read out by the processor 101 and each dot level is compared with the reference value stored in the reference value memory 103 to determine whether it is in a good state or not. For instance, if an ideal repetitive pattern of "00" and "11" is stored in the reference value memory 103 as a reference value, it can be determined whether the dot level state is good or not good by comparing the actual dot level pattern with the ideal pattern. The above-mentioned level test is performed to each of the R-color, G-color, and B-color of the video signal by switching the selector 105.

Gradation Test Section

In the gradation test, a pattern is designated in such a manner that the gradation of the video signal output from the video signal generator 10 sequentially changes for every horizontal line.

The other output terminal of the selector 106 is connected to the input terminal of the A/D converter 401. The A/D converter 401 operates in accordance with a clock signal CS2 generated by a clock signal generating circuit 402 to output gradation data GD for every horizontal line. The gradation data GD output from the A/D converter 401 is sequentially written onto a gradation test memory circuit 403 in accordance with the clock signal CS2.

The A/D converter 401 has a predetermined number of quantization bits the number of which is greater than that corresponding to the level resolution of the video signal produced by the video signal generator 10 by at least two bits.

The clock signal generating circuit 402 operates based on a control signal received from the processor 101 and generates the clock signal CS2 having a frequency represented by the following equation:

$$f_{cs2}=(T_D \times T_{M2}/100))^{-1} [Hz]$$

where $T_D$ is one horizontal line display time (sec) of the video signal and $T_{M2}$ is a measurement precision (%).

The gradation test data for one frame stored in the gradation test memory circuit 403 are sequentially read out and compared with gradation test reference values stored in the reference value memory 108 to determine whether or not it is in a good state. The above gradation test is performed to the RGB video signal with respect to each color by switching the selector 105.

Measurement of Sync Check Items

Figure 3:
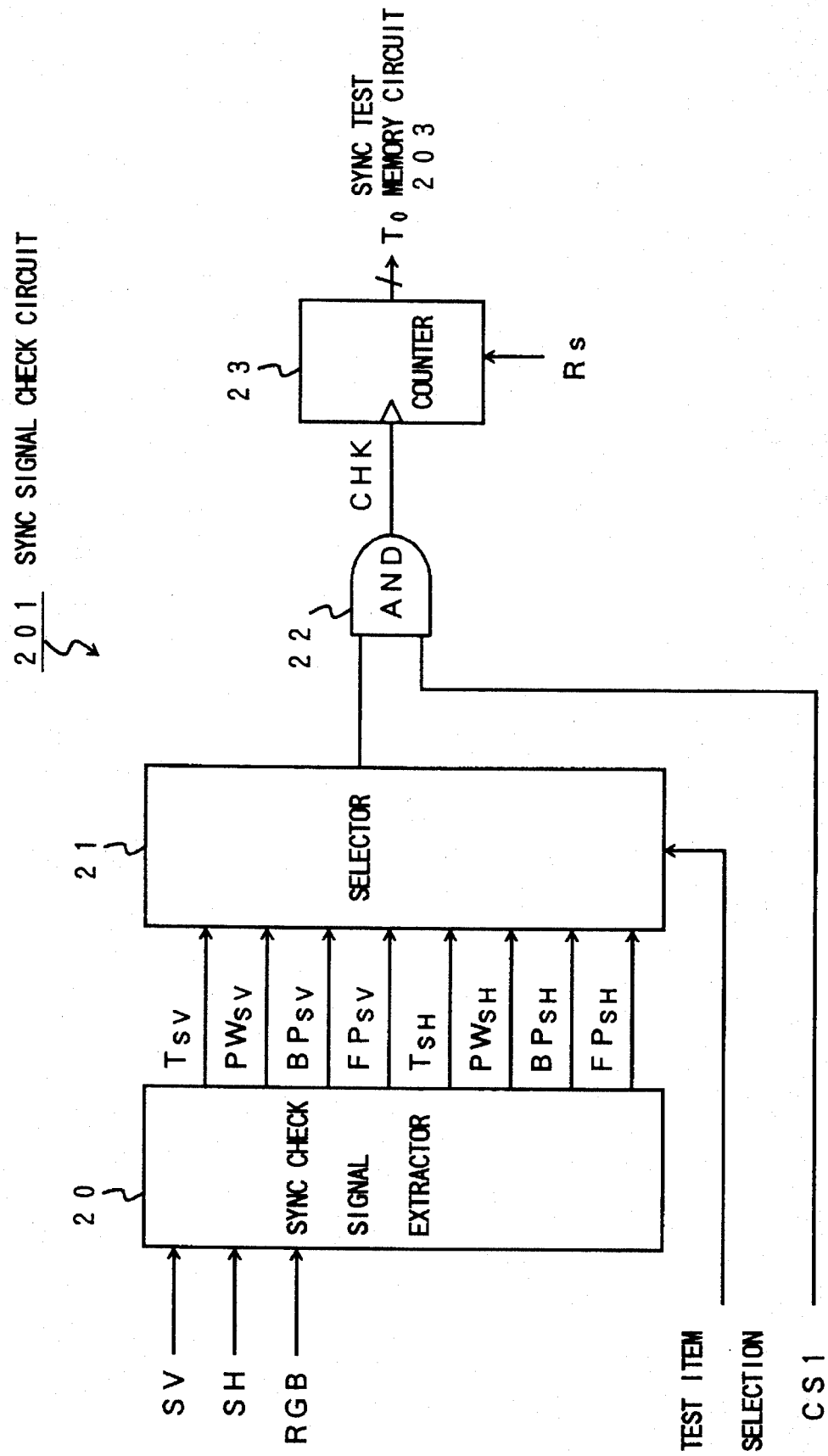
FIG. 3 is a block diagram showing a sync signal check circuit in the first embodiment.

As shown in FIG. 3, the sync signal check circuit 201 is comprised of a sync check signal extractor 20, a selector 21, an AND gate 22, and a counter 23. The sync check signal extractor 20 outputs pulse signals having pulse widths corresponding to the respective sync check items required for the sync signal test.

Figure 4:
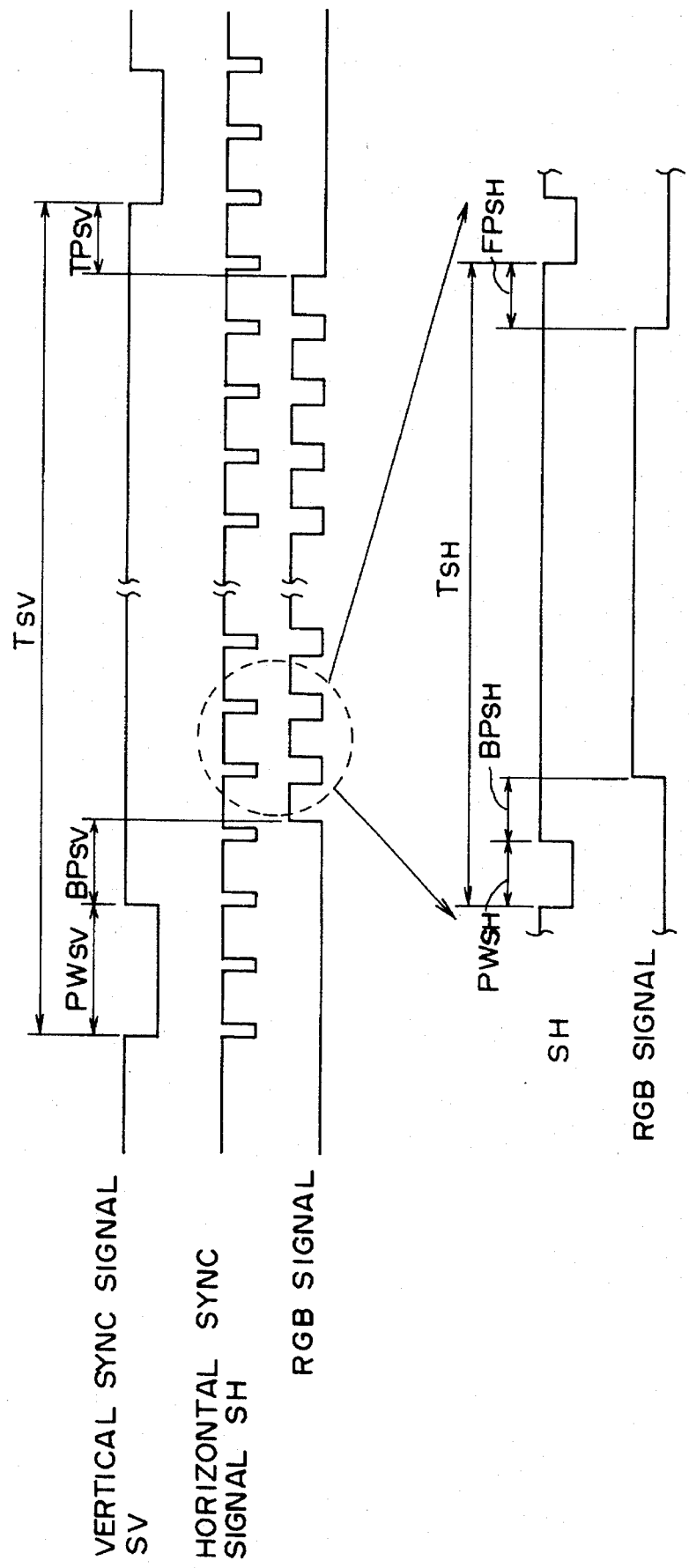
FIG. 4 is a timing chart used for explaining the operation of the sync signal check circuit.

More specifically, referring to FIG. 4, the sync check signal extractor 20 receives the vertical sync signal SV, the horizontal sync signal SH and the RGB video signal from the video signal generator 10, and outputs sync check signals for the following items: a period of time $T_{SV}$, a pulse width $PW_{SV}$, a back porch $BP_{SV}$, and a front porch $FP_{SV}$ of the vertical sync signal SV; a period of time $T_{SH}$, a pulse width $PW_{SH}$, a back porch $BP_{SH}$, and a front porch $FP_{SH}$ of the horizontal sync signal SH.

The selector 21 selects one of the above sync check signals in response to an item selection instruction from the processor 101. The selected sync check signal and the clock signal CS1 are input to the AND gate 22 and the output CHK of the AND gate 22 is counted by the counter 23 so that the duration of selected item is measured as the count of the counter 23.

Figure 5:
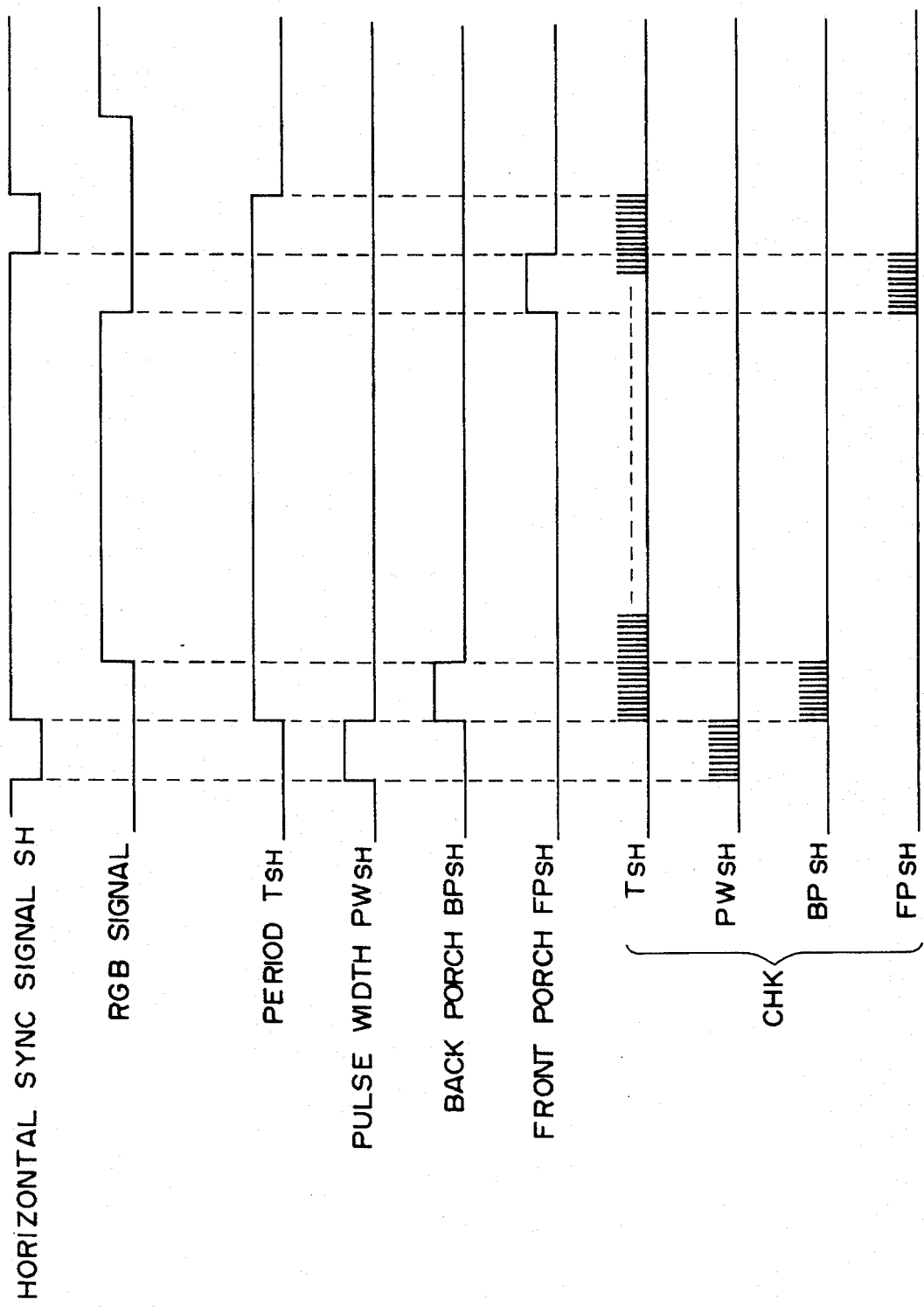
FIG. 5 is a timing chart showing in detail the check operation of the horizontal sync signal shown in FIG. 4.

Referring to FIG. 5, the operation of the sync signal check circuit will be described below in detail taking a case of the horizontal sync signal SH as an example. Note that in the sync signal test a pattern is designated in such a manner that the RGB video signal has a maximum level with respect to each color.

Receiving the horizontal sync signal SH and the RGB video signal from the video signal generator 10, the sync check signal extractor 20 outputs a signal $PW_{SH}$ having the same pulse width as the horizontal sync signal SH, a signal $T_{SH}$ having the same pulse width as the period of time of the horizontal sync signal SH, a signal $BP_{SH}$ having the same pulse width as the back porch of the horizontal sync signal SH, and a signal $FP_{SH}$ having the same pulse width as the front porch of the horizontal sync signal SH. Since the AND gate 22 performs an AND function on the clock signal CS1 and a signal selected by the selector 21, the counter 23 receives clock pulses of the number corresponding to the pulse width of each the sync check signal from the AND gate 22. In this manner, the sync check items such as the period of time and the pulse width, etc. of the horizontal sync signal SH are measured as the count values by the counter 23. The same can be said as for the vertical sync signal SV. In this embodiment, the sync check data for one frame thus measured is stored in the sync test memory circuit 203.

It should be noted that the sync check signals of the back porch and the front porch may be extracted from the vertical blanking signal and horizontal blanking signal obtained from the video signal generator 10.

Generation of Dot Level Data

Figure 6:
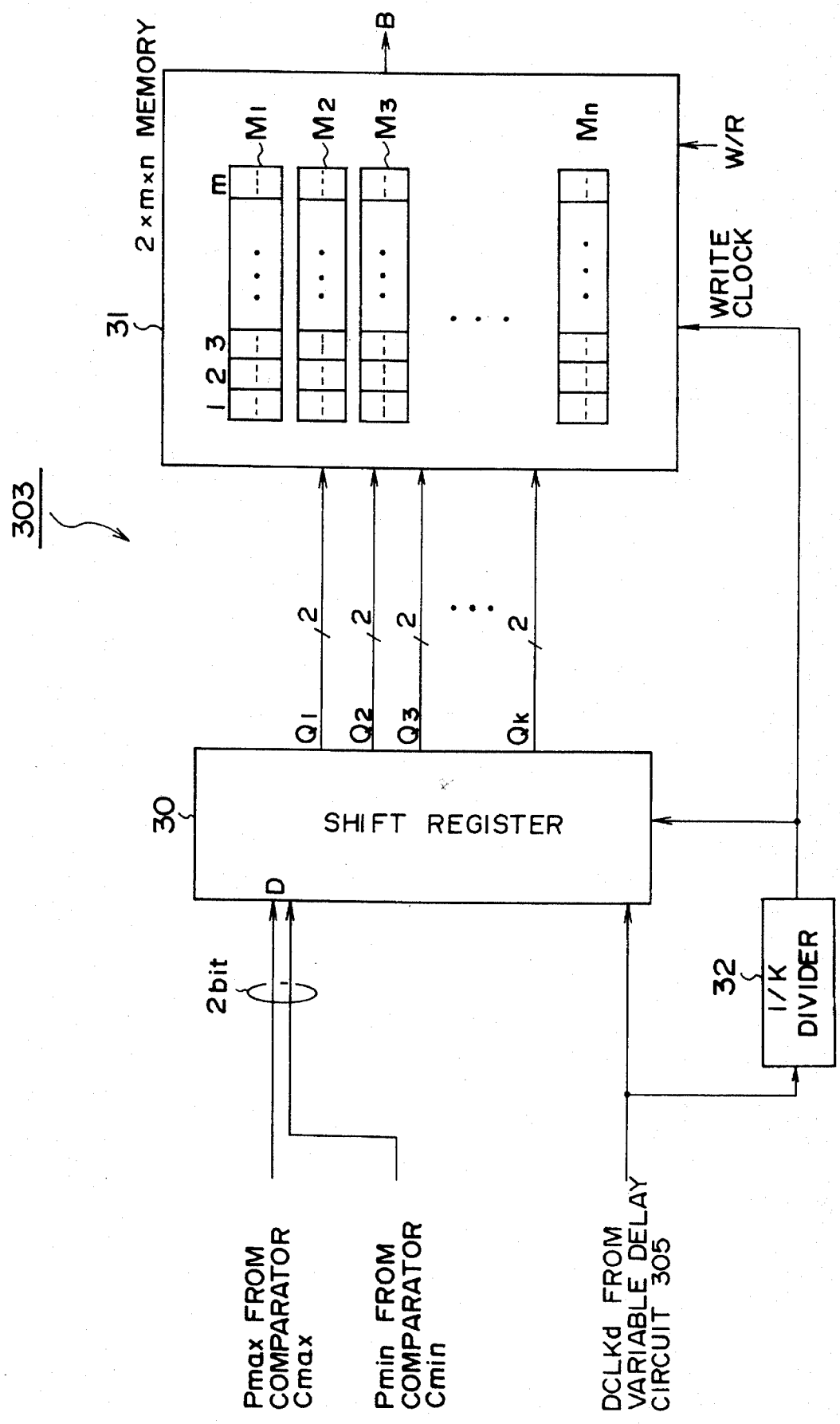
FIG. 6 is a block diagram showing a level test memory in the first embodiment.

FIG. 6 is a circuit block diagram showing the level test memory circuit 303. In the present embodiment, the 2-bit data comprising the pulse signals Pmax and Pmin output from the analog comparator 301 decrease in speed through a shift register 30 and are written into a memory 31 as parallel data Q1 to Qk. The shift register 30 is provided for speed adjustment and if the speed adjustment is unnecessary, the 2-bit data may be written onto the memory 31 directly.

The shift register 30 receives the 2-bit data from the analog comparator 301 in accordance with a dot clock signal DCLKd. The dot clock signal DCLKd is divided to 1/k by a frequency divider 32 and in response to the divided clock signal the parallel data Q1–Qk is transferred from the shift register 30 to the memory 31. The memory 31 has a capacity of 2×m×n (bits) and can store the 2-bit dot level data for one frame comprising m×n dots.

Figure 7:
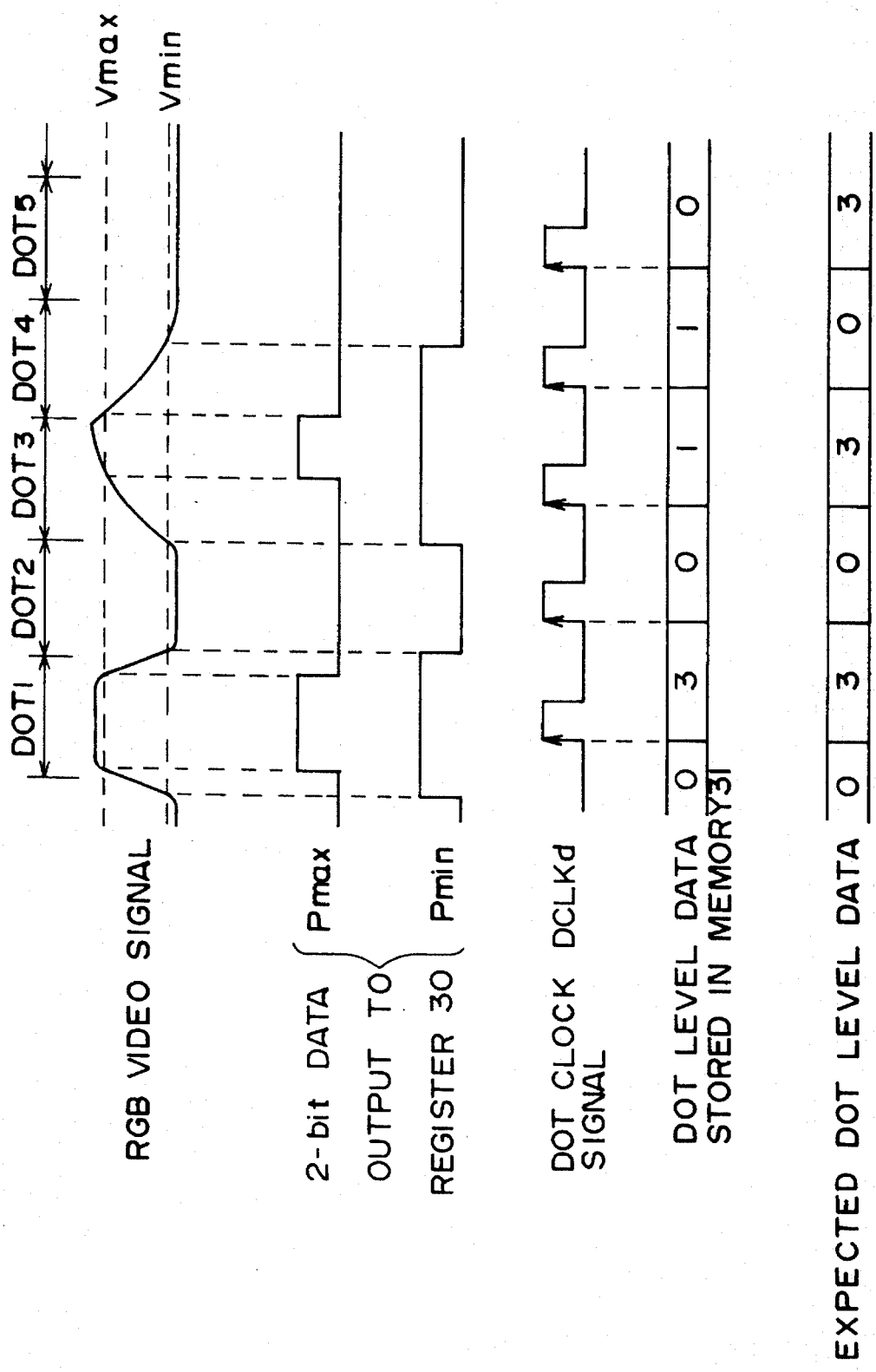
FIG. 7 is a waveform diagram for explaining the operation of a level test and a diagram showing an ideal level pattern used in the level test in the first embodiment.

Referring to FIG. 7, the method of producing the dot level data will be described below. For simplification of the description, as shown in FIG. 7, it is assumed that of the five dots $DOT_1$ to $DOT_5$ of the RGB video signal the dots $DOT_1$ and $DOT_2$ are normal and the dots $DOT_3$ to $DOT_5$ are abnormal. It should be noted that a pattern is designated in such a manner that the maximum level and minimum level of the RGB video signal are alternatively repeated for each dot. Therefore, if the video signal has no abnormal dot, the dots $DOT_1$, $DOT_3$ and $DOT_5$ have the maximum level and the dots $DOT_1$ and $DOT_4$ have the minimum level.

With the video signal generated by the video signal generator 10 in accordance with the designated pattern, one color component of the video signal is selected by the selector 105 and is output to the analog comparator 301 through the selector 106. The analog comparator 301 compares the video signal with the reference voltage Vmax and voltage Vmin to output the 2-bit data comprising the pulse signals Pmax and Pmin.

On the other hand, the dot clock signal DCLK which is synchronous with the horizontal sync signal SH and has a frequency m times higher than the horizontal sync signal SH is adjusted in phase by the variable delay circuit 305 such that it is positioned on an almost center position of a dot of the RGB video signal. Based on the dot clock signal DCLKd thus adjusted in phase, the 2-bit data of the analog comparator 301 are written onto the memory 31 of the level test memory circuit 303.

Since the dots dot $DOT_1$ and dot $DOT_2$ are normal, the 2-bit data sampled in accordance with the dot clock signal DCLKd are written onto the memory 31 as the dot level data of "11" ($3_{(16)}$) and "00" ($0_{(16)}$), respectively. However, because the rising of the pulse signal Pmax of the comparator Cmax is delayed as for the dots $DOT_3$ as shown in FIG. 7, the 2-bit data is "01" ($1_{(16)}$) at the timing of the dot clock signal DCLKd. In this manner, the dot level data of "30110"$_{(16)}$ is written onto the memory 31 Since the expected dot level data stored in the reference value memory 103 is "30303", the processor 101 compares the dot level data of "30110" with the reference data of "30303" and determines that the dots $DOT_3$ to $DOT_5$ are fault dots.

Generation of Gradation Data

In the gradation test, as shown in FIG. 8A, a pattern is designated in such a manner that the video signal output from the video signal generator 10 has the same gradation over one horizontal line and has gradation sequentially changed for every horizontal line. As shown in FIG. 8B, for instance, if the RGB video signal has the gradation of 256 levels, the gradation is changed from the first line to the 256th line level by level. If this pattern is moved in a vertical direction, all the horizontal lines are subjected to all the gradation levels. With the video signal output from the video signal generator 10 in accordance with the above pattern, one color of video signal is selected by the selector 105 and is input to the A/D converter 401 through the selector 106.

The A/D converter 401 converts the video signal into digital gradation data GD in accordance with the clock signal CS2 generated for every horizontal line and outputs the digital gradation data GD to the gradation test memory circuit 403. The processor 101 sequentially reads out the gradation data GD thus stored and compares it with the reference value stored in the reference value memory 103 to determine the normal or fault state of gradation.

Video Signal Test Procedure

Figure 9:
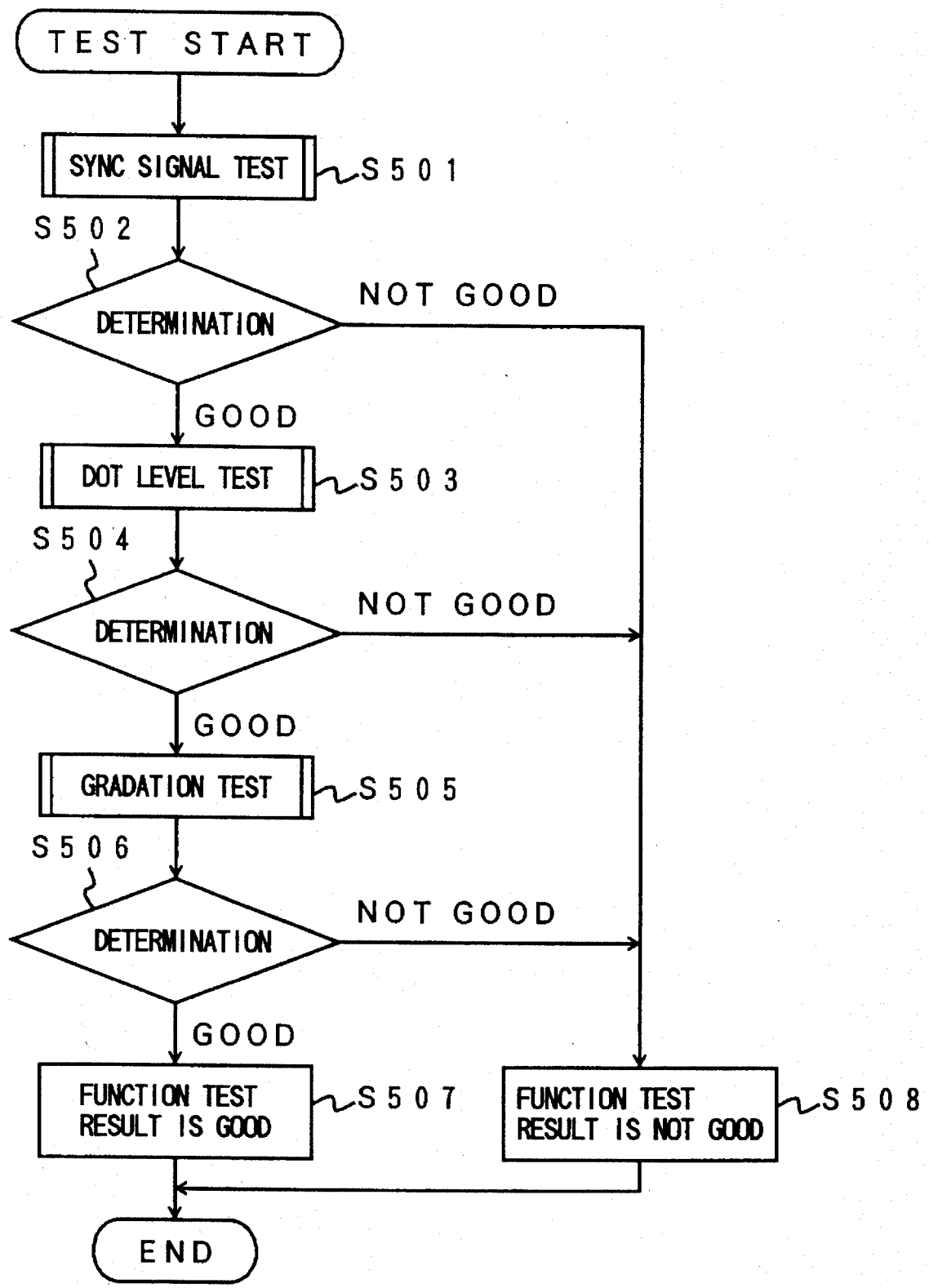
FIG. 9 is a flow chart of an outline of a video signal test method according to an embodiment according to the present invention.

The above-mentioned sync signal test, dot level test, and gradation test are performed by the processor 101 in an order shown in FIG. 9. First, the sync signal test is executed (S501). If the result indicates the good state (S502), then the dot level test is executed (S503). If the result of the dot level test indicates the good state (S504), then the gradation test is executed (S505). If the result indicates the good state (S506), then the result of the function test is determined to be good (S507). Thus, all the test processes are completed. If the not good state is determined in any one of the tests, then the result of the function test is determined to be not good without executing the subsequent tests (S508), resulting in immediate completion of the test processes.

Figure 10:
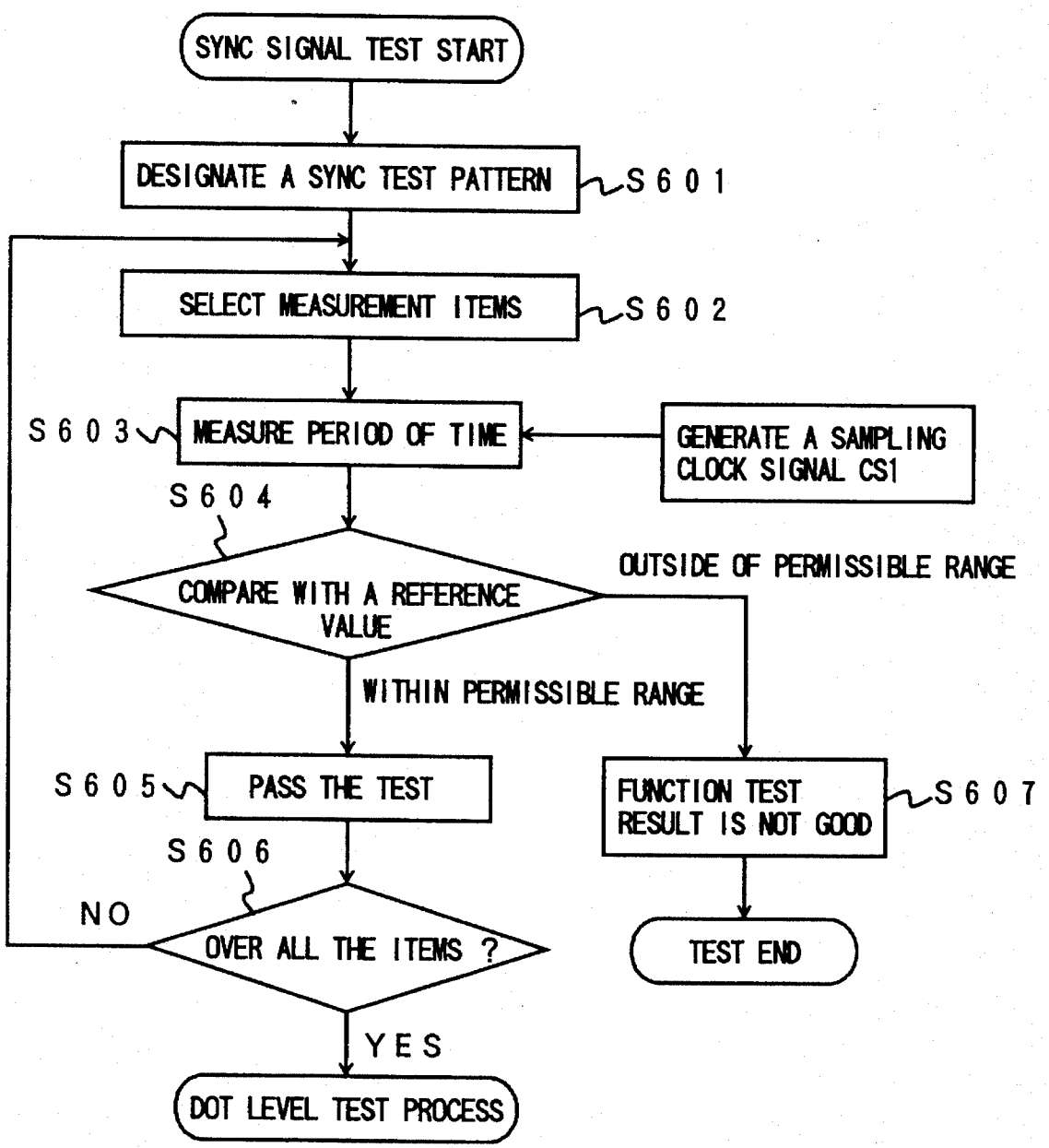
FIG. 10 is a flow chart showing the procedure of a sync signal test in the embodiment.

FIG. 10 shows a sync signal test routine. First, a pattern for the sync signal test is designated (S601), the vertical sync signal SV, the horizontal sync signal SH, and the RGB video signal are output from the video signal generator 10 in accordance with the pattern. The sync signal check circuit 201 selects each item to be tested such as a time of period and a pulse width in accordance with the instruction from the processor 101 (S602), and measures the time using the clock signal CS1 (S603). The measurement value and the reference value are compared with each other (S604). As a result, if the measurement value falls within the permissible range of the reference value, then it is determined to be good (S605). The above-mentioned processes S602 to S605 are repeated until the measurement and determination are completed for all the items (S606). After the completion, the control proceeds to the next dot level test process. If it is determined in the determination (S604) that the measurement value is outside of the permissible range, then the function test result is determined to be not good at that time (S607) and the test processes are completed without executing the next test.

Figure 11:
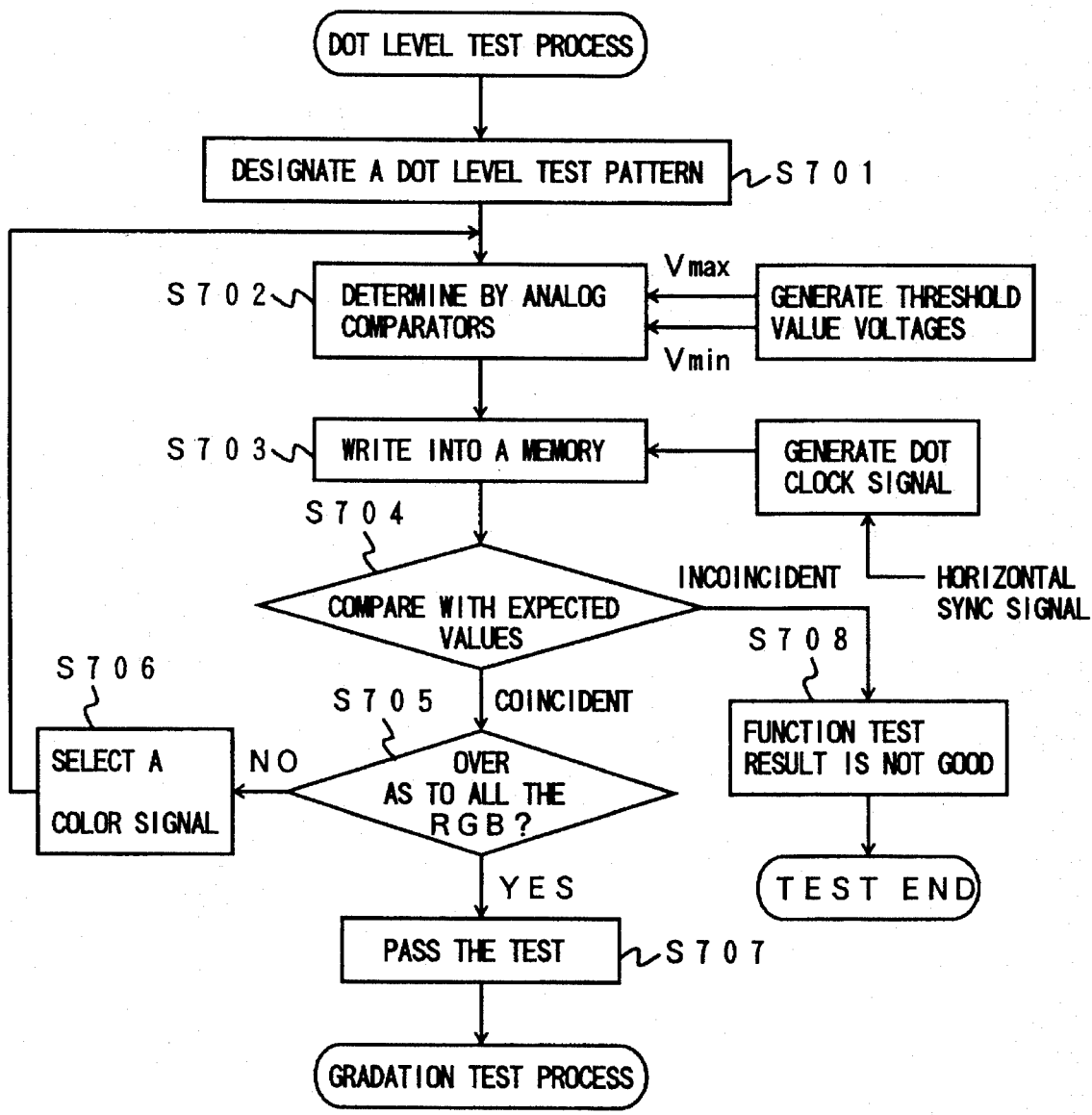
FIG. 11 is a flow chart showing the procedure of a dot level test in the embodiment.

FIG. 11 shows a dot level test routine. First, a pattern for sync signal test is designated (S701) and the vertical sync signal SV, the horizontal sync signal SH, and the RGB video signal are output from the video signal generator 10 in accordance with the pattern. The processor 101 also operates the selector 106 by a selection signal SS such that the selector 105 is connected to the analog comparator 301. The analog comparator 301 compares the level of video signal selected by the selector 105 with the threshold voltages Vmax and Vmin to output the 2-bit dot level data (S702). The 2-bit dot level data is written onto the level test memory circuit 303 (S703). Then, the dot level data pattern is compared with an expected pattern stored in the reference value memory 103 by the processor 101 (S704). If the coincidence is achieved, then it is determined whether the test is executed as for all the color signals R, G, and B (S705). The above-mentioned processes S702 to S704 are executed with respect to all the RGB color signals while switching the selector 105 (S706). When the patterns for all the RGB color signals coincide with the expected patterns, it is determined to be good (S707) and the control proceeds to the next gradation test. If any one of the patterns is not coincident with the expected pattern, it is determined to be not good (S708) and the test is ended.

Figure 12:
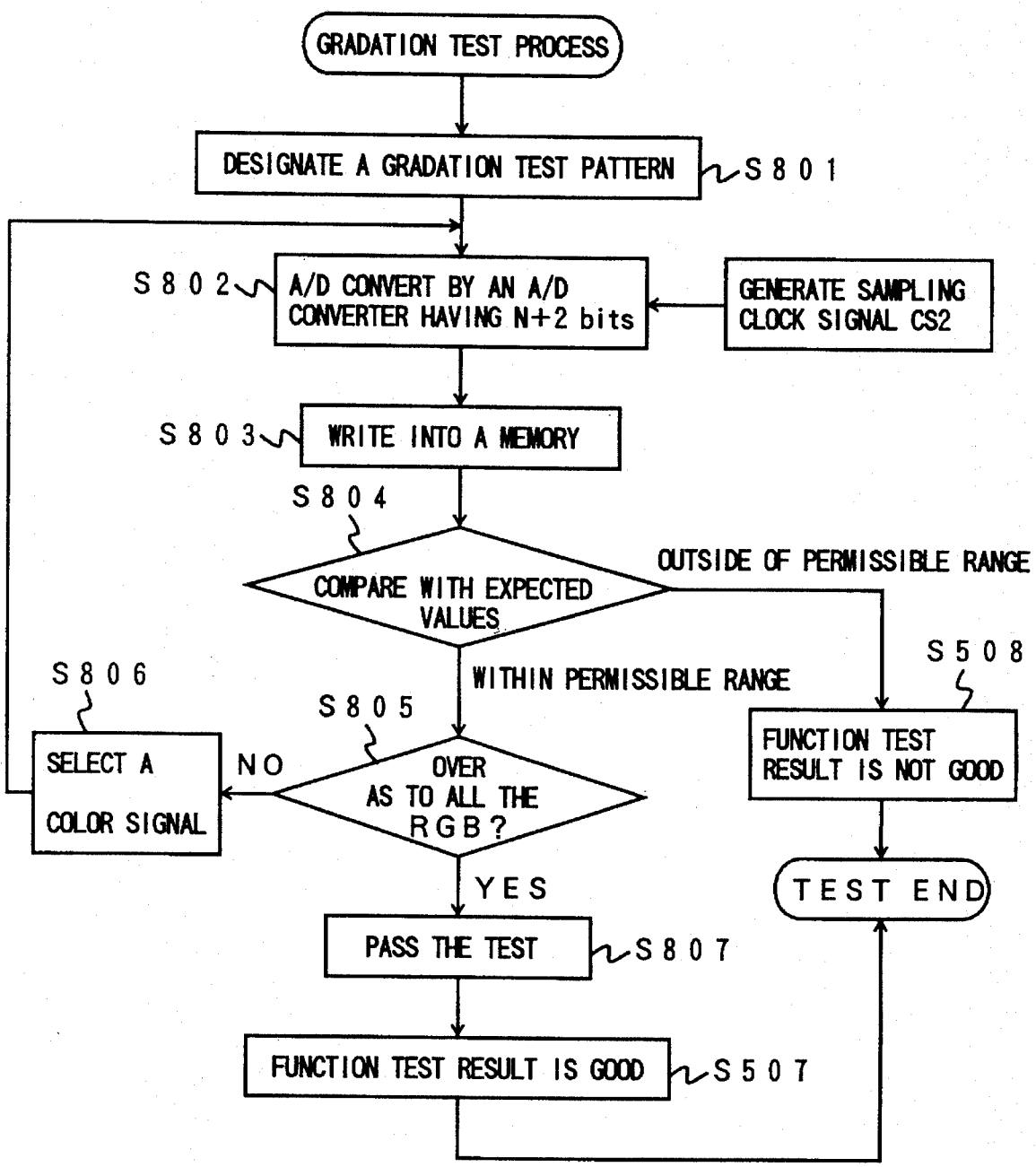
FIG. 12 is a flow chart showing the procedure of a gradation test in the embodiment.

FIG. 12 shows a gradation test routine. First, a pattern for the gradation test is designated (S801), the vertical sync signal SV, the horizontal sync signal SH, and the RGB video signal are output from the video signal generator 10 in accordance with the pattern. Further, the processor 101 operates the selector 106 by the selection signal SS such that the selector 105 is connected to the A/D converter 401. The A/D converter 401 converts the video signal selected by the selector 105 into a digital signal in accordance with the clock signal CS2 produced for every horizontal line (S802) and the gradation data GD is written onto the gradation test memory circuit 403 (S803). Then, the gradation data is compared with an expected value stored in the reference value memory 103 by the processor 101 (S804), and if the gradation data falls within a permissible range of the reference value, then it is determined whether the test is executed for all the RGB color signals (S805). The above-mentioned processes S802 to S804 are executed for all the RGB color signals while switching the selector 105 (S806). If the gradation data of all the RGB color signals fall within the permissible range, it is determined to be good (S807). As a result, it is determined that the function test is totally good (S507) and the test is ended. If any one of the gradation data is outside of the permissible range, it is determined that the function test result is not good (S508) and the test is ended.

SECOND EMBODIMENT

Figure 13:
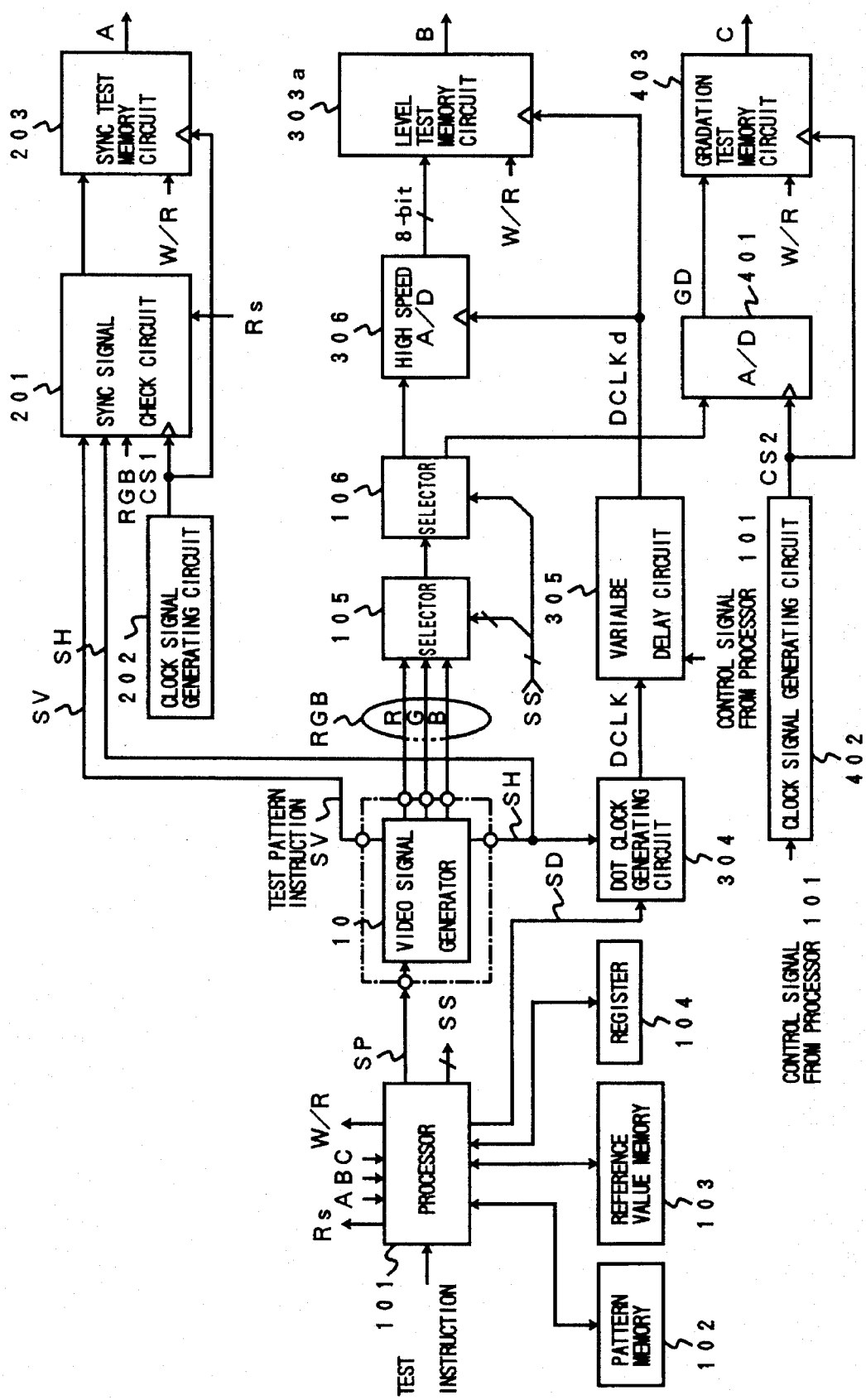
FIG. 13 is a block diagram showing the video signal test apparatus according to a second embodiment of the present invention.

As shown in FIG. 13, in the second embodiment of the present invention, a high speed A/D converter 306 is employed in place of the analog comparator 301 in the first embodiment. In conjunction with this, the threshold voltage supply 302 in the first embodiment is removed and the level test memory circuit 303 is modified to input 8-bit data. More particularly, in the level test memory circuit 303 shown in FIG. 6, the shift register 30 is modified to a shift register for converting the 8-bit data from serial to parallel and further the memory 31 is modified to a memory having a capacity of 8×m×n bits.

The high speed A/D converter 306 converts the video signal selected by the selector 105 into an 8-bit digital signal in accordance with the dot clock signal DCLKd and the digital signal is output to the level test memory circuit 303a. Since the other components and operations are the same as in the first embodiment, the description will be omitted.

According to the present invention, because the RGB video signal is converted into a digital signal by the high speed A/D converter 306 for every color of video signal, the A/D converter 306 of 8 bits can be used so that it can readily cope with the high resolution. In order to A/D convert a high resolution RGB video signal as it is, it is necessary to drive the A/D converter of 10 bits or more with a sampling clock signal of 100 MHz or more, resulting in disadvantage in cost.

THIRD EMBODIMENT

Figure 14:
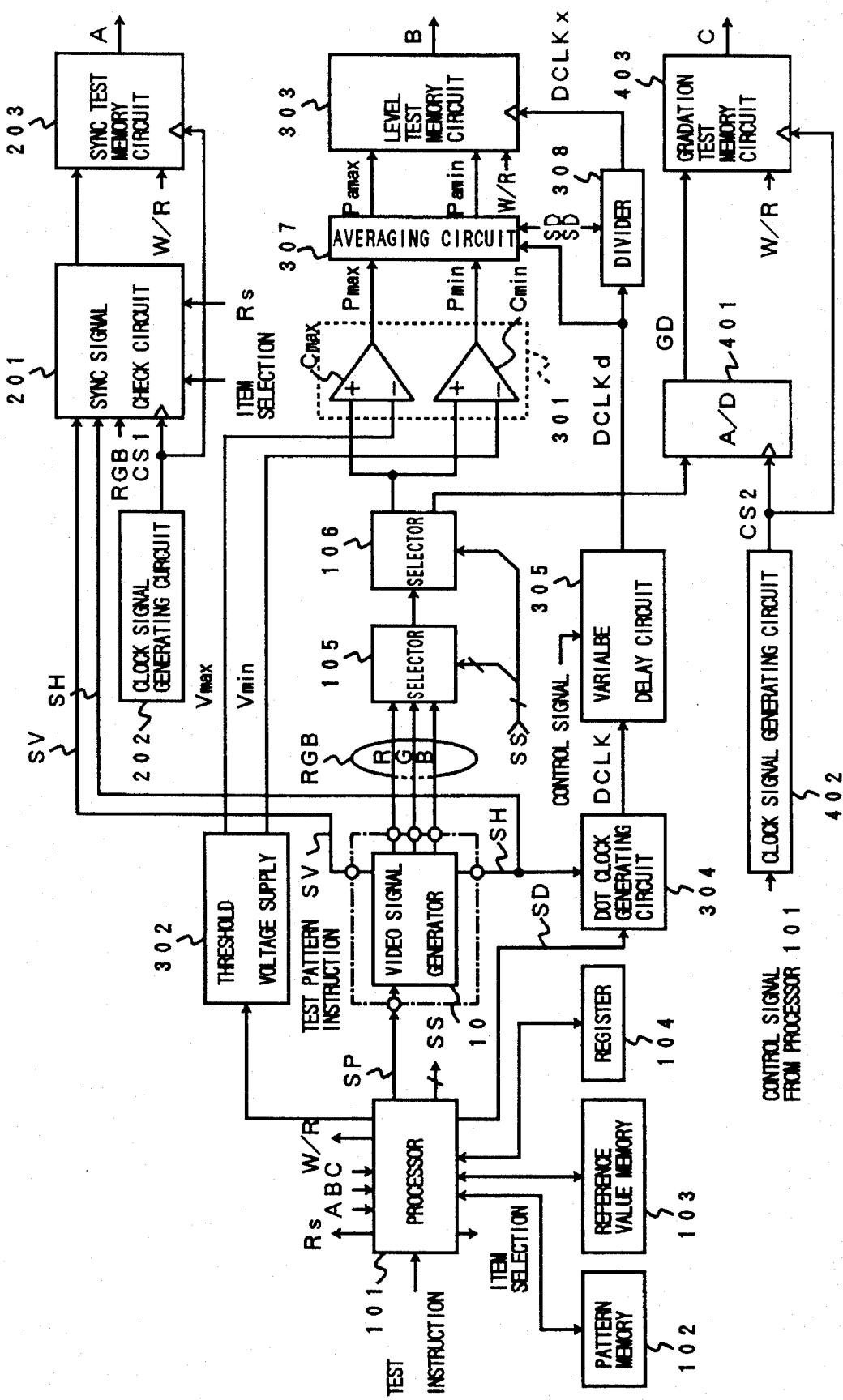
FIG. 14 is a block diagram showing the video signal test apparatus according to a third embodiment of the present invention.

FIG. 14 shows the third embodiment of the present invention. In the embodiment, an averaging circuit 307 is provided between the analog comparator 301 and the level test memory circuit 303 to average pulse signals Pmax and Pmin of the analog comparator 301 over a period of one dot, respectively, and outputs the respective averaged value signals Pamax and Pamin to the level test memory circuit 303 as the 2-bit data. The write operation to the level test memory circuit 303 is performed in accordance with a dot clock signal DCLKx divided from the dot clock signal DCLKd by the frequency divider 308. In this case, the dot clock signal DCLK output from the dot clock signal generating circuit 304 has a frequency an integral number of times higher than that in the first embodiment with the integral number determined in accordance with the frequency division designation signal SD.

Figure 15:
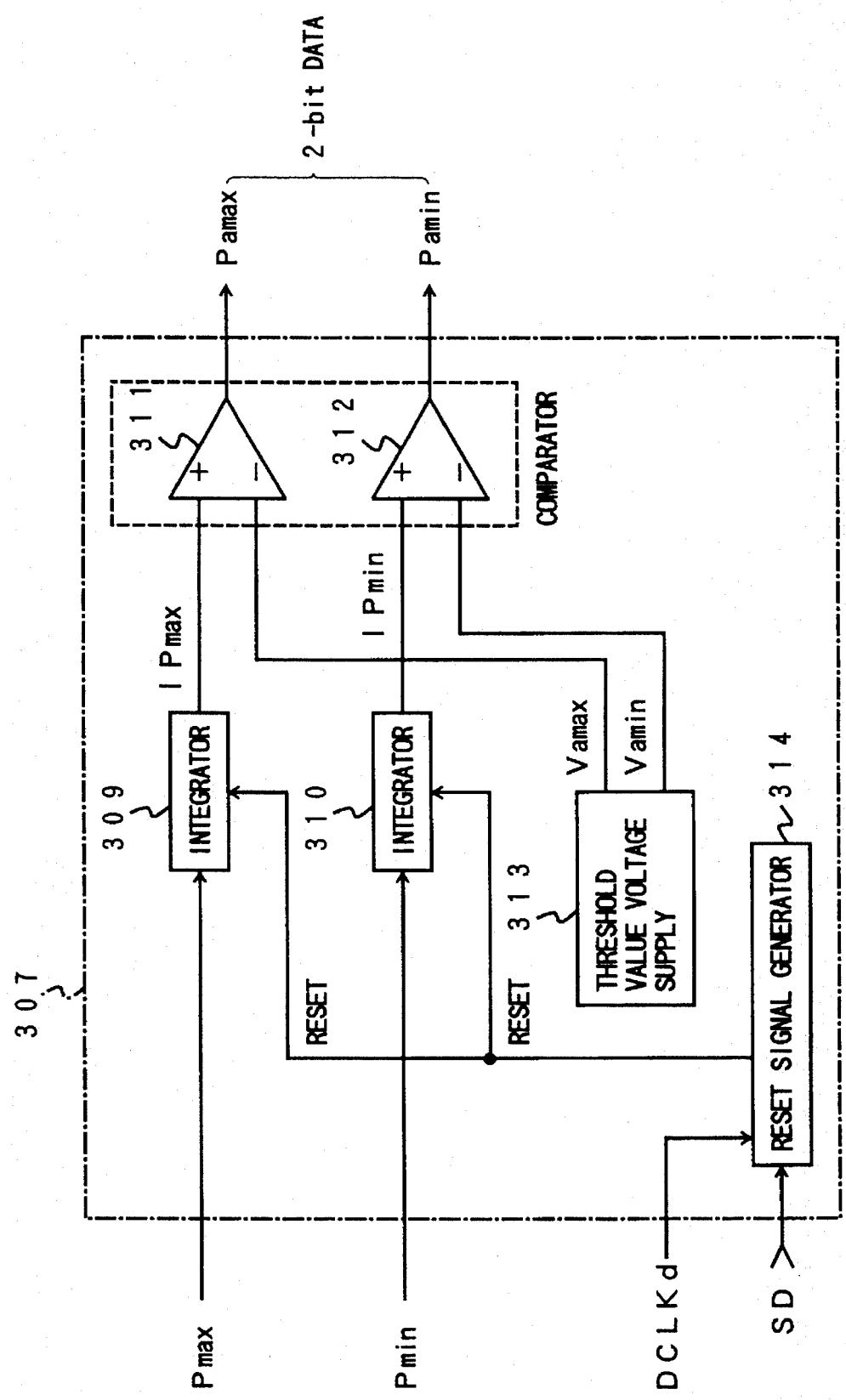
FIG. 15 is a block diagram showing an averaging circuit in the third embodiment.

FIG. 15 is a block diagram showing the averaging circuit 307. Integrators 309 and 310 input the pulse signals Pmin and Pmin from the analog comparator 301 and output the integrated values IPmax and IPmin to the non-inverting input terminals of the analog comparator 311 and analog comparator 312, respectively. The respective inverting input terminals of the analog comparators 311 and 312 are supplied with threshold voltages Vamax and Vamin from the threshold voltage supply 313. A reset signal generator 314 receives the dot clock signal DCLKd and the frequency division designation signal SD and supplies a reset signal to the integrators 309 and 310 each time a dot period of time is ended. The analog comparators 311 and 312 output the averaged value signals Pamax and Pamin as the results of comparison to the level test memory circuit 303 as 2-bit data.

Figure 16:
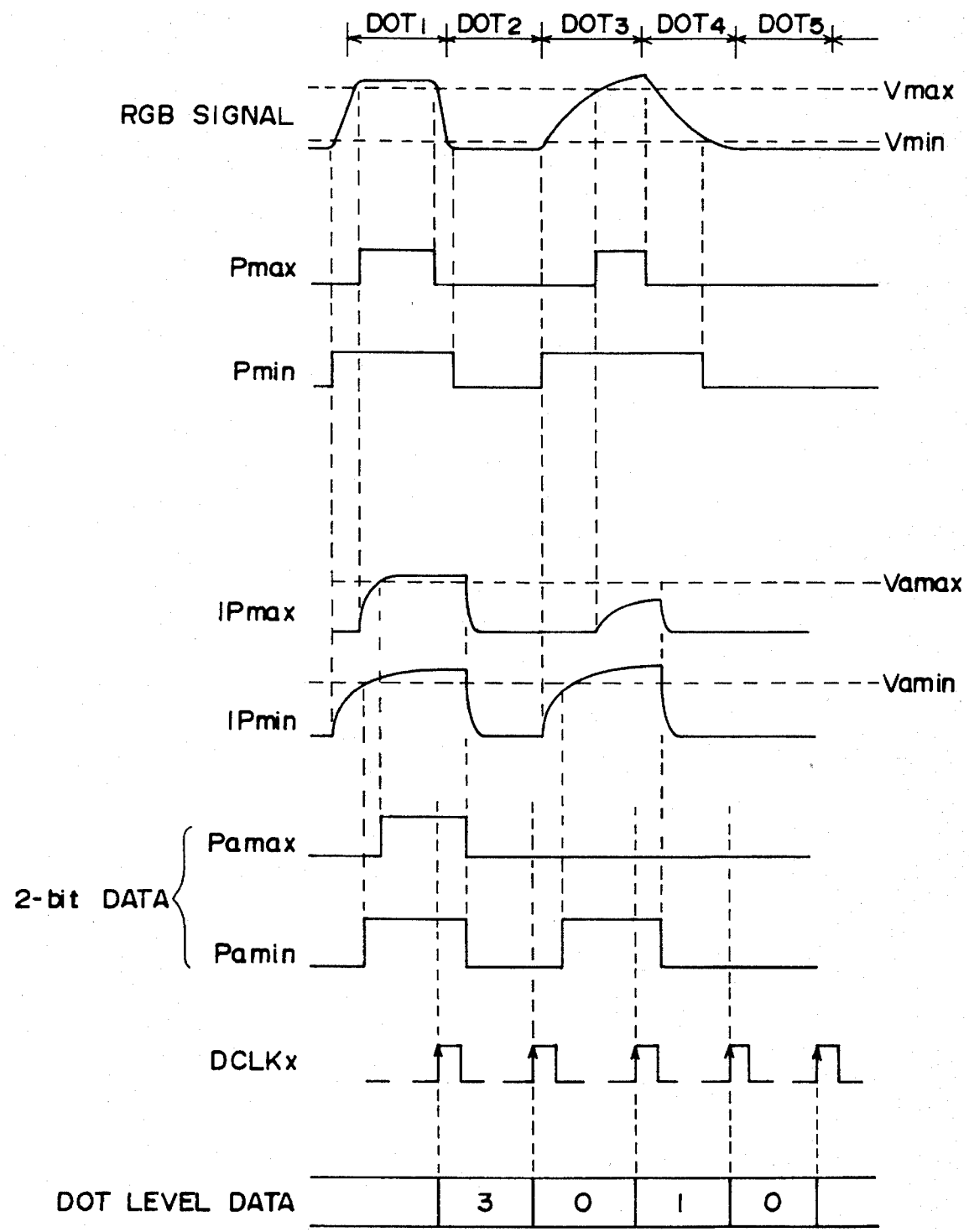
FIG. 16 is a waveform diagram for explaining the operation of the level test in the third embodiment.

Referring to FIG. 16, the operation of the averaging circuit 307 will be described below. It is assumed that the RGB video signal and the pulse signals Pmax and Pmin of the analog comparator 301 are identical to those shown in FIG. 7. When such pulse signals Pmax and Pmin are input, the integrators 309 and 310 of the averaging circuit 307 output voltages IPmax and IPmin having the waveforms as shown in the figure, respectively. When these integrated value IPmax and IPmin are more than the threshold voltages Vamax and Vamin, respectively, high voltages appear on the respective output terminals of the analog comparator 311 and analog comparator 312. In an example shown in FIG. 16, because the pulse width of the pulse signal Pmax for the dot $DOT_2$ is short, the integrated value IPmax does not rise to the voltage Vamax. As a result, the averaged value signal Pamax of a high level is not output from the analog comparator 311. For this reason, in a case where the averaged value signals Pamax and Pamin are seen as 2-bit data, if a dot is normal, "11" ($3_{(16)}$) should be obtained. However, if a dot is abnormal, "01" ($1_{(16)}$) appears in the 2-bit data so that it can be determined that it is a fault dot.

In this manner, by providing the averaging circuit 307, the dot level can be tested over the whole dot period so that the dot level test result becomes more accurate.

What is claimed is:

1. A method for performing a function test of a video signal generator based on a plurality of sync signals and a video signal which are generated by the video signal generator, the video signal comprising a predetermined number of horizontal lines for a frame, each horizontal line comprising a predetermined number of dots, the method comprising:

a first test step comprising the steps of:

measuring respective time periods of predetermined specification items of the sync signals; and determining whether all the time periods fall within a predetermined region from respective specification values of the predetermined specification items, a second test step comprising the steps of:

instructing the video signal generator to generate a first video signal having a dot discriminating pattern in which dot levels vary from dot to dot; and determining whether a dot level pattern of an actual first video signal generated by the video signal generator is coincident with the dot discriminating pattern, and a third test step comprising the steps of:

instructing the video signal generator to generate a second video signal having a gradation change pattern in which gradation levels vary for each the horizontal line; and determining whether all the gradation levels of an actual second video signal generated by the video signal generator fall within a predetermined region from respective specification values of the gradation change pattern, wherein:

the second test step is performed only when all the time periods fall within the predetermined region from specification values of the predetermined specification items in the first test step;

the third test step is performed only when the dot level pattern is coincident with the dot discriminating pattern in the second test step;

the function test is terminated with a result indicating that the video signal generator is good, in a case where all the gradation levels fall within the predetermined region from respective specification values of the gradation change pattern in the third test step; and the function test is terminated with a result indicating that the video signal generator is not good, in any of a case where at least one of the time periods falls outside the predetermined region from specification values of the predetermined specification items in the first test step, a case where the dot level pattern is not coincident with the dot discriminating pattern in the second test step, and a case where at least one of the gradation levels fall outside the predetermined region from the respective specification values of the gradation change pattern.

2. The method according to claim 1, wherein the sync signals comprise a vertical sync signal and a horizontal sync signal.

3. The method according to claim 2, wherein the predetermined specification items of the sync signals in the first test step comprises a period, a pulse width, a back porch, and a front porch.

4. The method according to claim 1, wherein the second test step uses the dot discriminating pattern in which a maximum dot level and a minimum dot level repeat alternatively from dot to dot.

5. A method for performing a function test of a video signal generator based on a plurality of sync signals and a video signal which are generated by the video signal generator, the video signal comprising a predetermined number of horizontal lines for a frame, each horizontal line comprising a predetermined number of dots, the method comprising:

a first test step comprising the steps of:

measuring respective time periods of predetermined specification items of the sync signals; and determining whether all the time periods fall within a predetermined region from specification values of the predetermined specification items, a second test step comprising the steps of:

instructing the video signal generator to generate a first video signal having a dot discriminating pattern in which dot levels vary from dot to dot;

converting an actual first video signal generated by the video signal generator into digital dot level data in dots;

storing the digital dot level data for a frame; and determining whether a dot level pattern of the digital dot level data for the frame is coincident with the dot discriminating pattern, and a third test step comprising the steps of:

instructing the video signal generator to generate a second video signal having a gradation change pattern in which gradation levels vary for every horizontal line;

converting gradation levels of an actual second video signal generated by the video signal generator into digital gradation level data;

storing the digital gradation level data for a frame; and determining whether all the digital gradation level data fall within a predetermined region from specification values of the gradation change pattern, wherein:

the second test step is performed only when all the time periods fall within the predetermined region from specification values of the predetermined specification items in the first test step;

the third test step is performed only when the dot level pattern is coincident with the dot discriminating pattern in the second test step;

the function test is terminated with a result indicating that the video signal generator is good, in a case where all the digital gradation level data fall within the predetermined region from respective specification values of the gradation change pattern in the third test step; and the function test is terminated with a result indicating that the video signal generator is not good, in any of a case where at least one of the time periods falls outside the predetermined region from specification values of the predetermined specification items in the first test step, a case where the dot level pattern is not coincident with the dot discriminating pattern in the second test step, and a case where at least one of the digital gradation level data fall outside the predetermined region from the respective specification values of the gradation change pattern.

6. The method according to claim 5, wherein the sync signals comprise a vertical sync signal and a horizontal sync signal.

7. The method according to claim 6, wherein the predetermined specification items of the sync signals in the first test step comprises a period, a pulse width, a back porch, and a front porch.

8. The method according to claim 5, wherein the second test step uses the dot discriminating pattern in which a maximum dot level and a minimum dot level repeat alternatively from dot to dot.

9. A method for performing a function test of a video signal generator based on a plurality of sync signals and a video signal which are generated by the video signal generator, the video signal comprising a plurality of color signals, each color signal comprising a predetermined number of horizontal lines for a frame, each horizontal line comprising a predetermined number of dots, the method comprising:

a first test step comprising the steps of:

measuring respective time periods of predetermined specification items of the sync signals; and determining whether all the time periods fall within a predetermined region from respective specification values of the predetermined specification items, a second test step comprising the steps of:

instructing the video signal generator to generate a first video signal having a dot discriminating pattern in which dot levels vary from dot to dot;

selecting a color signal from the plurality of color signals of an actual first video signal generated by the video signal generator; and determining whether a dot level pattern of the color signal is coincident with the dot discriminating pattern, and a third test step comprising the steps of:

instructing the video signal generator to generate a second video signal having a gradation change pattern in which gradation levels vary for each horizontal line;

selecting a color signal from the plurality of color signals of an actual second video signal generated by the video signal generator; and determining whether all the gradation levels of the color signal fall within a predetermined region from respective specification values of the gradation change pattern, wherein:

the second test step is performed only when all the time periods fall within the predetermined region from specification values of the predetermined specification items in the first test step;

the third test step is performed only when the dot level pattern is coincident with the dot discriminating pattern in the second test step;

the function test is terminated with a result indicating that the video signal generator is good, in a case where all the gradation levels fall within the predetermined region from respective specification values of the gradation change pattern in the third test step; and the function test is terminated with a result indicating that the video signal generator is not good, in any of a case where at least one of the time periods falls outside the predetermined region from specification values of the predetermined specification items in the first test step, a case where the dot level pattern is not coincident with the dot discriminating pattern in the second test step, and a case where at least one of the gradation levels fall outside the predetermined region from the respective specification values of the gradation change pattern.

10. The method according to claim 9, wherein the sync signals comprise a vertical sync signal and a horizontal sync signal.

11. The method according to claim 10, wherein the predetermined specification items of the sync signals in the first test step comprises a period, a pulse width, a back porch, and a front porch.

12. The method according to claim 9, wherein the second test step uses the dot discriminating pattern in which a maximum dot level and a minimum dot level repeat alternatively from dot to dot.

13. The method according to claim 9, wherein the plurality of color signals comprises a red(R) signal, a green(G) signal, and a blue(B) signal.

14. A method for performing a function test of a video signal generator based on a plurality of sync signals and a video signal which are generated by the video signal generator, the video signal comprising a plurality of color signals, each color signal comprising a predetermined number of horizontal lines for a frame, each horizontal line comprising a predetermined number of dots, the method comprising:

a first test step comprising the steps of:

measuring respective time periods of predetermined specification items of the sync signals; and determining whether all the time periods fall within a predetermined region from respective specification values of the predetermined specification items, a second test step comprising the steps of:

instructing the video signal generator to generate a first video signal having a dot discriminating pattern in which dot levels vary from dot to dot;

selecting a color signal from the plurality of color signals of an actual first video signal generated by the video signal generator;

converting the color signal into digital dot level data in dots;

storing the digital dot level data for a frame; and determining whether a dot level pattern of the digital dot level data is coincident with the dot discriminating pattern, and a third test step comprising the steps of:

instructing the video signal generator to generate a second video signal having a gradation change pattern in which gradation levels vary for each horizontal line;

selecting a color signal from the plurality of color signals of an actual second video signal generated by the video signal generator;

converting gradation levels of the color signal into digital gradation level data;

storing the digital gradation level data for a frame; and determining whether all the gradation levels of the digital gradation level data fall within a predetermined region from respective specification values of the gradation change pattern, wherein:

the second test step is performed only when all the time periods fall within the predetermined region from specification values of the predetermined specification items in the first test step;

the third test step is performed only when the dot level pattern is coincident with the dot discriminating pattern in the second test step;

the function test is terminated with a result indicating that the video signal generator is good, in a case where all the gradation levels fall within the predetermined region from respective specification values of the gradation change pattern in the third test step; and the function test is terminated with a result indicating that the video signal generator is not good, in any of a case where at least one of the time periods falls outside the predetermined region from specification values of the predetermined specification items in the first test step, a case where the dot level pattern is not coincident with the dot discriminating pattern in the second test step, and a case where at least one of the gradation levels fall outside the predetermined region from the respective specification values of the gradation change pattern.

15. The method according to claim 14, wherein the sync signals comprise a vertical sync signal and a horizontal sync signal.

16. The method according to claim 15, wherein the predetermined specification items of the sync signals in the first test step comprises a period, a pulse width, a back porch, and a front porch.

17. The method according to claim 14, wherein the second test step uses the dot discriminating pattern in which a maximum dot level and a minimum dot level repeat alternatively from dot to dot.

18. The method according to claim 14, wherein the plurality of color signals comprises a red(R) signal, a green(G) signal, and a blue(B) signal.

19. An apparatus for performing a function test of a video signal generator based on a plurality of sync signals and a video signal which are generated by the video signal generator, the video signal comprising a predetermined number of horizontal lines for a frame, each horizontal line comprising a predetermined number of dots, the apparatus comprising:

pattern instructing means for instructing the video signal generator to generate a video signal having a test pattern selected from a dot discriminating pattern in which dot levels vary from dot to dot and a gradation change pattern in which gradation levels vary for each horizontal line;

first test means comprising:

measuring means for measuring respective time periods of predetermined specification items of the sync signals; and first determining means for determining whether all the time periods fall within a predetermined region from respective specification values of the predetermined specification items, second test means comprising:

dot test pattern selecting means for selecting the dot discriminating pattern to instruct the video signal generator to generate a first video signal; and second determining means for determining whether a dot level pattern of an actual first video signal generated by the video signal generator is coincident with the dot discriminating pattern, third test means comprising:

gradation test pattern selecting means for selecting the gradation change pattern to instruct the video signal generator to generate a second video signal; and third determining means for determining whether all the gradation levels of an actual second video signal generated by the video signal generator fall within a predetermined region from respective specification values of the gradation change pattern, and control means for controlling the function test such that:

the second test means is operated only when the first determining means determines that all the time periods fall within the predetermined region from specification values of the predetermined specification items;

the third test means is operated only when the second determining means determines that the dot level pattern is coincident with the dot discriminating pattern;

the function test is terminated with a result indicating that the video signal generator is good, in a case where the third determining means determines that all the gradation levels fall within the predetermined region from respective specification values of the gradation change pattern; and the function test is terminated with a result indicating that the video signal generator is not good, in any of a case where the first determining means determines that at least one of the time periods falls outside the predetermined region from specification values of the predetermined specification items, a case where the second determining means determines that the dot level pattern is not coincident with the dot discriminating pattern, and a case where the third determining means determines that at least one of the gradation levels fall outside the predetermined region from the respective specification values of the gradation change pattern.

20. The apparatus according to claim 19, wherein the sync signals comprise a vertical sync signal and a horizontal sync signal.

21. The apparatus according to claim 20, wherein the predetermined specification items of the sync signals in the first test step comprises a period, a pulse width, a back porch, and a front porch.

22. The method according to claim 19, wherein the second test step uses the dot discriminating pattern in which a maximum dot level and a minimum dot level repeat alternatively from dot to dot.

23. An apparatus for performing a function test of a video signal generator based on a plurality of sync signals and a video signal which are generated by the video signal generator, the video signal comprising a predetermined number of horizontal lines for a frame, each horizontal line comprising a predetermined number of dots, the apparatus comprising:

pattern instructing means for instructing the video signal generator to generate a video signal having a test pattern selected from a dot discriminating pattern in which dot levels vary from dot to dot and a gradation change pattern in which gradation levels vary for each horizontal line;

first test means comprising:

measuring means for measuring respective time periods of predetermined specification items of the sync signals; and first determining means for determining whether all the time periods fall within a predetermined region from respective specification values of the predetermined specification items, second test means comprising:

dot test pattern selecting means for selecting the dot discriminating pattern to instruct the video signal generator to generate a first video signal;

first conversion means for converting an actual first video signal generated by the video signal generator into digital dot level data in dots;

first storage means for storing the digital dot level data for a frame; and second determining means for determining whether a dot level pattern of the digital dot level data is coincident with the dot discriminating pattern, third test means comprising:

gradation test pattern selecting means for selecting the gradation change pattern to instruct the video signal generator to generate a second video signal;

second conversion means for converting gradation levels of an actual second video signal generated by the video signal generator into digital gradation level data;

second storage means for storing the digital gradation level data for a frame; and third determining means for determining whether all the digital gradation level data fall within a predetermined region from respective specification values of the gradation change pattern, and control means for controlling the function test such that:

the second test means is operated only when the first determining means determines that all the time periods fall within the predetermined region from specification values of the predetermined specification items;

the third test means is operated only when the second determining means determines that the dot level pattern is coincident with the dot discriminating pattern;

the function test is terminated with a result indicating that the video signal generator is good, in a case where the third determining means determines that all the digital gradation level data fall within the predetermined region from respective specification values of the gradation change pattern; and the function test is terminated with a result indicating that the video signal generator is not good, in any of a case where the first determining means determines that at least one of the time periods falls outside the predetermined region from specification values of the predetermined specification items, a case where the second determining means determines that the dot level pattern is not coincident with the dot discriminating pattern, and a case where the third determining means determines that at least one of the digital gradation level data fall outside the predetermined region from the respective specification values of the gradation change pattern.

24. The apparatus according to claim 23, wherein the sync signals comprise a vertical sync signal and a horizontal sync signal.

25. The apparatus according to claim 24, wherein the predetermined specification items of the sync signals in the first test step comprises a period, a pulse width, a back porch, and a front porch.

26. The apparatus according to claim 24, wherein the second test means further comprises dot clock generating means for generating a dot clock signal having a variable frequency synchronized with the horizontal sync signal, the first conversion means converting the actual first video signal into digital dot level data in dots based on the dot clock signal, and the first storage means storing the digital dot level data based on the dot clock signal.

27. The apparatus according to claim 23, wherein the second test step uses the dot discriminating pattern in which a maximum dot level and a minimum dot level repeat alternatively from dot to dot.

28. The apparatus according to claim 23, wherein the first conversion means comprises an analog-to-digital converter having a predetermined number of quantization bits not greater than eight(8) bits.

29. The apparatus according to claim 28, wherein the analog-to-digital converter has two(2) quantization bits.

30. The apparatus according to claim 23, wherein the first conversion means comprises:

voltage generating means for generating a high voltage and a low voltage which both fall within a voltage range between a maximum level and a minimum level of each dot of the video signal; and comparison means for comparing the video signal with both the high voltage and the low voltage to output the digital dot level data.

31. The apparatus according to claim 30, wherein the comparison means comprises:

a first analog comparator for comparing the video signal with the high voltage; and a second analog comparator for comparing the video signal with the low voltage.

32. The apparatus according to claim 31, wherein the second test means further comprises:

first averaging means for averaging an output of the first analog comparator for each dot to output a first averaged signal; and second averaging means for averaging an output of the second analog comparator for each dot to output a second averaged signal.

33. The apparatus according to claim 32, wherein:

the first averaging means comprises:

a first integrator for integrating the output of the first analog comparator to output a first integrated signal; and a third analog comparator for comparing the first integrated signal with a first reference voltage, the second averaging means comprises:

a second integrator for integrating the output of the second analog comparator to output a second integrated signal; and a fourth analog comparator for comparing the second integrated signal with a second reference voltage lower than the first reference voltage.

34. An apparatus for performing a function test of a video signal generator based on a plurality of sync signals and a video signal which are generated by the video signal generator, the video signal comprising a plurality of color signals, each color signal comprising a predetermined number of horizontal lines for a frame, each horizontal line comprising a predetermined number of dots, the apparatus comprising:

pattern instructing means for instructing the video signal generator to generate a video signal having a test pattern selected from a dot discriminating pattern in which dot levels vary from dot to dot and a gradation change pattern in which gradation levels vary for each horizontal line;

first test means comprising:

measuring means for measuring respective time periods of predetermined specification items of the sync signals; and first determining means for determining whether all the time periods fall within a predetermined region from respective specification values of the predetermined specification items, second test means comprising:

dot test pattern selecting means for selecting the dot discriminating pattern to instruct the video signal generator to generate a first video signal;

first selecting means for selecting a color signal from the plurality of color signals of an actual first video signal generated by the video signal generator; and second determining means for determining whether a dot level pattern of the color signal is coincident with the dot discriminating pattern, third test means comprising:

gradation test pattern selecting means for selecting the gradation change pattern to instruct the video signal generator to generate a second video signal;

second selecting means for selecting a color signal from the plurality of color signals of an actual second video signal generated by the video signal generator; and third determining means for determining whether all the gradation levels of the color signal fall within a predetermined region from respective specification values of the gradation change pattern, and control means for controlling the function test such that:

the second test means is operated only when the first determining means determines that all the time periods fall within the predetermined region from specification values of the predetermined specification items;

the third test means is operated only when the second determining means determines that the dot level pattern is coincident with the dot discriminating pattern;

the function test is terminated with a result indicating that the video signal generator is good, in a case where the third determining means determines that all the gradation levels fall within the predetermined region from respective specification values of the gradation change pattern; and the function test is terminated with a result indicating that the video signal generator is not good, in any of a case where the first determining means determines that at least one of the time periods falls outside the predetermined region from specification values of the predetermined specification items, a case where the second determining means determines that the dot level pattern is not coincident with the dot discriminating pattern, and a case where the third determining means determines that at least one of the gradation levels fall outside the predetermined region from the respective specification values of the gradation change pattern.

35. The apparatus according to claim 34, wherein the sync signals comprise a vertical sync signal and a horizontal sync signal.

36. The apparatus according to claim 35, wherein the predetermined specification items of the sync signals in the first test step comprises a period, a pulse width, a back porch, and a front porch.

37. The apparatus according to claim 34, wherein the second test step uses the dot discriminating pattern in which a maximum dot level and a minimum dot level repeat alternatively from dot to dot.

38. The apparatus according to claim 34, wherein the plurality of color signals comprises a red(R) signal, a green(G) signal, and a blue(B) signal.

39. An apparatus for performing a function test of a video signal generator based on a plurality of sync signals and a video signal which are generated by the video signal generator, the video signal comprising a plurality of color signals, each color signal comprising a predetermined number of horizontal lines for a frame, each horizontal line comprising a predetermined number of dots, the apparatus comprising:

pattern instructing means for instructing the video signal generator to generate a video signal having a test pattern selected from a dot discriminating pattern in which dot levels vary from dot to dot and a gradation change pattern in which gradation levels vary for each horizontal line;

first test means comprising:

measuring means for measuring respective time periods of predetermined specification items of the sync signals; and first determining means for determining whether all the time periods fall within a predetermined region from respective specification values of the predetermined specification items, second test means comprising:

dot test pattern selecting means for selecting the dot discriminating pattern to instruct the video signal generator to generate a first video signal;

first selecting means for selecting a color signal from the plurality of color signals of an actual first video signal generated by the video signal generator; and first conversion means for converting the color signal into digital dot level data in dots;

first storage means for storing the digital dot level data for a frame; and second determining means for determining whether a dot level pattern of the digital dot level data is coincident with the dot discriminating pattern, third test means comprising:

gradation test pattern selecting means for selecting the gradation change pattern to instruct the video signal generator to generate a second video signal;

second selecting means for selecting a color signal from the plurality of color signals of an actual second video signal generated by the video signal generator; and second conversion means for converting gradation levels of the color signal into digital gradation level data;

second storage means for storing the digital gradation level data for a frame; and third determining means for determining whether all the digital gradation level data fall within a predetermined region from respective specification values of the gradation change pattern, and control means for controlling the function test such that:

the second test means is operated only when the first determining means determines that all the time periods fall within the predetermined region from specification values of the predetermined specification items;

the third test means is operated only when the second determining means determines that the dot level pattern is coincident with the dot discriminating pattern;

the function test is terminated with a result indicating that the video signal generator is good, in a case where the third determining means determines that all the digital gradation level data fall within the predetermined region from respective specification values of the gradation change pattern; and the function test is terminated with a result indicating that the video signal generator is not good, in any of a case where the first determining means determines that at least one of the time periods falls outside the predetermined region from specification values of the predetermined specification items, a case where the second determining means determines that the dot level pattern is not coincident with the dot discriminating pattern, and a case where the third determining means determines that at least one of the digital gradation level data fall outside the predetermined region from the respective specification values of the gradation change pattern.

40. The apparatus according to claim 39, wherein the sync signals comprise a vertical sync signal and a horizontal sync signal.

41. The apparatus according to claim 40, wherein the predetermined specification items of the sync signals in the first test step comprises a period, a pulse width, a back porch, and a front porch.

42. The apparatus according to claim 40, wherein the second test means further comprises dot clock generating means for generating a dot clock signal having a variable frequency synchronized with the horizontal sync signal, the first conversion means converting the actual first video signal into digital dot level data in dots based on the dot clock signal, and the first storage means storing the digital dot level data based on the dot clock signal.

43. The apparatus according to claim 39, wherein the second test step uses the dot discriminating pattern in which a maximum dot level and a minimum dot level repeat alternatively from dot to dot.

44. The apparatus according to claim 39, wherein the plurality of color signals comprises a red(R) signal, a green(G) signal, and a blue(B) signal.

45. The apparatus according to claim 39, wherein the first conversion means comprises an analog-to-digital converter having a predetermined number of quantization bits not greater than eight(8) bits.

46. The apparatus according to claim 45, wherein the analog-to-digital converter has two(2) quantization bits.

47. The apparatus according to claim 39, wherein the first conversion means comprises:

voltage generating means for generating a high voltage and a low voltage which both fall within a voltage range between a maximum level and a minimum level of each dot of the video signal; and comparison means for comparing the video signal with both the high voltage and the low voltage to output the digital dot level data.

48. The apparatus according to claim 47, wherein the comparison means comprises:

a first analog comparator for comparing the video signal with the high voltage; and a second analog comparator for comparing the video signal with the low voltage.

49. The apparatus according to claim 48, wherein the second test means further comprises:

first averaging means for averaging an output of the first analog comparator for each the dot to output a first averaged signal; and second averaging means for averaging an output of the second analog comparator for each the dot to output a second averaged signal.

50. The apparatus according to claim 49, wherein:

the first averaging means comprises:

a first integrator for integrating the output of the first analog comparator to output a first integrated signal; and a third analog comparator for comparing the first integrated signal with a first reference voltage, the second averaging means comprises:

a second integrator for integrating the output of the second analog comparator to output a second integrated signal; and a fourth analog comparator for comparing the second integrated signal with a second reference voltage lower than the first reference voltage.

* * * * *